United States Patent [19]

Thompson et al.

[11] Patent Number: 5,644,775
[45] Date of Patent: Jul. 1, 1997

[54] METHOD AND SYSTEM FOR FACILITATING LANGUAGE TRANSLATION USING STRING-FORMATTING LIBRARIES

[75] Inventors: Suzanne Marie Thompson; Randal Lee Bertram, both of Lexington, Ky.

[73] Assignee: International Business Machines Corporation, Armonk, N.Y.

[21] Appl. No.: 289,153

[22] Filed: Aug. 11, 1994

[51] Int. Cl.⁶ .................................................. G06F 17/20
[52] U.S. Cl. ............................................ 395/757; 395/601
[58] Field of Search ............................. 395/456, 440, 395/474, 480, 497.06, 163, 164, 600; 364/419

[56] References Cited

U.S. PATENT DOCUMENTS

| | | | |
|---|---|---|---|
| 4,644,492 | 2/1987 | Murata | 364/900 |
| 4,688,195 | 8/1987 | Thompson et al. | 364/300 |
| 4,845,665 | 7/1989 | Heath et al. | 364/900 |
| 4,870,610 | 9/1989 | Belfer | 364/900 |
| 4,931,935 | 6/1990 | Ohira et al. | 364/419 |
| 4,974,191 | 11/1990 | Amirghodsi et al. | 364/900 |
| 5,113,517 | 5/1992 | Beard et al. | 364/200 |
| 5,115,501 | 5/1992 | Kerr | 395/600 |
| 5,140,522 | 8/1992 | Ito et al. | 364/419.02 |
| 5,179,700 | 1/1993 | Aihara et al. | 395/650 |
| 5,197,005 | 3/1993 | Shwartz et al. | 364/419 |
| 5,206,951 | 4/1993 | Khoyi et al. | 395/650 |
| 5,243,519 | 9/1993 | Andrews et al. | 364/419.05 |
| 5,291,585 | 3/1994 | Sato et al. | 395/500 |
| 5,434,776 | 7/1995 | Jain | 364/419.1 |

FOREIGN PATENT DOCUMENTS 0528640  8/1992  European Pat. Off. .......... G06F 9/44

OTHER PUBLICATIONS

Edwards et al., "Language Definition Of A Text Query," 36 *IBM Technical Disclosure Bulletin* 347 (Sep. 1993).
Petzold, Charles; Programming Windows, 1990 pp. 877–878.

*Primary Examiner*—Gail O. Hayes
*Assistant Examiner*—Krishna Kalidindi
*Attorney, Agent, or Firm*—Bookstein & Kudirka, P.C.; Daniel E. McConnell

[57] ABSTRACT

Methods and systems that facilitate translation of text associated with application programs (such as word processors, spreadsheets, and design software) into languages other than English are disclosed. At least the key textual terms of the application are isolated from executable program code and stored in separate character-string library files. Independent libraries are maintained for each foreign language into which the program is to be translated. Library entries are accessed by means of a string reader and formatter, which, in response to commands embedded in the application text, loads the appropriate libraries and retrieves the designated terms. The invention replaces text entries, which would otherwise appear alongside program code and require compilation, with commands designating character strings and, if desired, their manner of display as well.

11 Claims, 3 Drawing Sheets

METHOD AND SYSTEM FOR FACILITATING LANGUAGE TRANSLATION USING STRING-FORMATTING LIBRARIES

This application is filed with an appendix containing source-code listings.

BACKGROUND OF THE INVENTION

1. Field of the Invention

The present invention relates to operation of interactive computer programs, and more particularly to methods and systems for facilitating consistent translations of on-screen text into different languages.

2. Description of the Related Art

The worldwide proliferation of computer sales, and in particular the market for personal computers, has created a rapidly expanding need for translation of text associated with application programs (such as word processors, spreadsheets, and design software) into languages other than English. In particular, the on-screen elements presented to the user during operation of such programs typically contain textual information that guides the user through various interactive operations, or provides descriptive, explanatory or background information.

Wholesale translation of text into a foreign languages presents a number of difficulties, some relating to the integrity of the text itself and some deriving from efficiency considerations. Common English words and phrases, such as "File," "Open" and "Save," may have multiple, context-sensitive counterparts in foreign languages. While alternative use of these variations may occasionally be suitable for explanatory purposes, ordinarily a single, consistent term is most appropriately employed both in explanatory text and in "active" program elements such as menu bars, window captions and titles, dialog boxes and the like. The translator may be unaware of this need or, even if aware, fail on occasion to maintain the necessary consistency. The likelihood of error increases where program text is stored in unusual file formats. Whatever the cause, the probable result of linguistic inconsistency is user confusion and frustration. Moreover, needless multiple translations of the same text represents wasted effort.

Even sophisticated quality-control procedures can fail to detect each and every translation inconsistency. This is due to the large number of text entries in complex application programs, and the multitude of ways these can be presented to a user in the course of program execution.

The need for multiple language translations of an application program can also add considerably to the cost of its production and upkeep. Since the text portion of the program is ordinarily compiled along with the executable code, embedding the translation within the program itself results in the need to separately compile each foreign-language rendition of the application. This approach is employed in most prior-art translation systems, such as that disclosed in U.S. Pat. No. 5,243,519, and its inefficiency multiplies each time the program is modified or updated for re-release; each new version must then be separately recompiled.

DESCRIPTION OF THE INVENTION

In light of the foregoing, the present invention offers the advantage of ensuring consistent foreign-language translations of application software.

Another advantage offered by the invention is facilitation of text translations in a manner that minimizes unnecessary effort.

Still another advantage offered by the invention is avoidance of the need to maintain separate compiled renditions of an application program for each foreign-language translation thereof.

Yet another advantage of the invention is the ability of multiple applications to share access to a common set of translated terms.

It is yet another advantage of the invention to avoid the need for reintroduction of translated text into the body of an application program.

Other advantages will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

In accordance with the invention, at least the key textual terms of a software application are isolated from executable program code and stored in separate character-string library files. Independent libraries are maintained for each foreign language into which the program is to be translated. Library entries are accessed by means of a string reader and formatter, which, in response to commands embedded in the application text, loads the appropriate libraries and retrieves the designated terms. This obviates the need for manual introduction of the translated text into the program, thereby avoiding a frequent source of error.

To facilitate handling of the separately stored text, a scripting language is preferably used to mark the text for on-screen formatting. The invention replaces text entries, which would otherwise appear alongside program code and require compilation, with commands designating character strings and, possibly, their manner of display as well. This arrangement permits maintenance of a single worldwide version of the application program that may be modified and recompiled as necessary without concern as to the text. Conversely, changes may be made to the string files without disturbing executable code.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
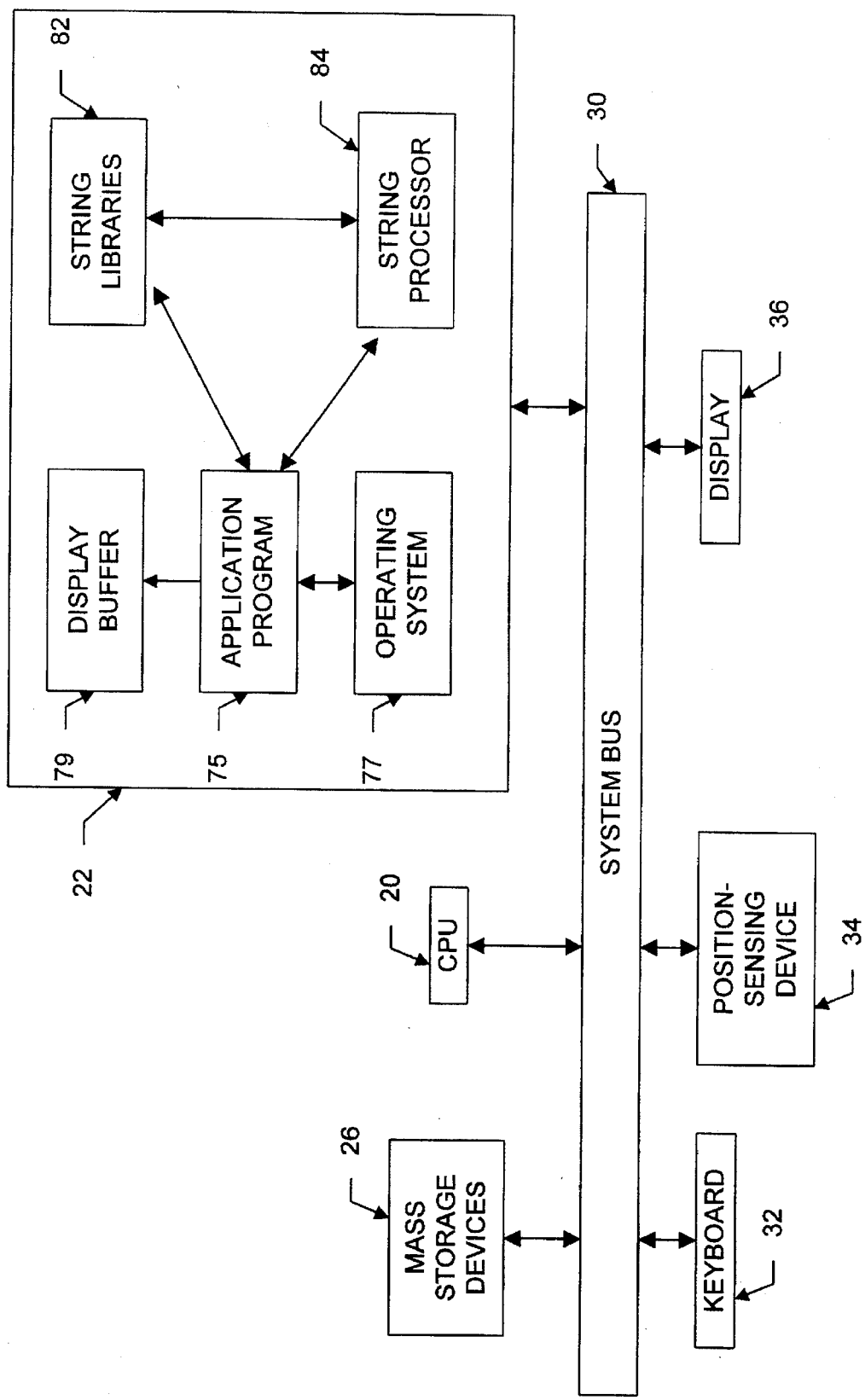
FIG. 1 is a block diagram of a computer system embodying the present invention.

Refer first to FIG. 1, which illustrates, in block-diagram form, a computer system incorporating the invention. The system includes a central-processing unit 20, which performs operations on and interacts with a main system memory 22 and components thereof (described in greater detail below). The system further includes at least one mass storage device 26, which contains permanent files of information, including data created by the user and the string processor and libraries discussed below. All components of the system communicate over a system bus 30.

The user interacts with the system using a keyboard 32 and a position-sensing device (e.g., a mouse) 34. The output of either device can be used to designate information or select particular areas of a screen display 36 corresponding to functions to be performed by the system.

Figure 2:
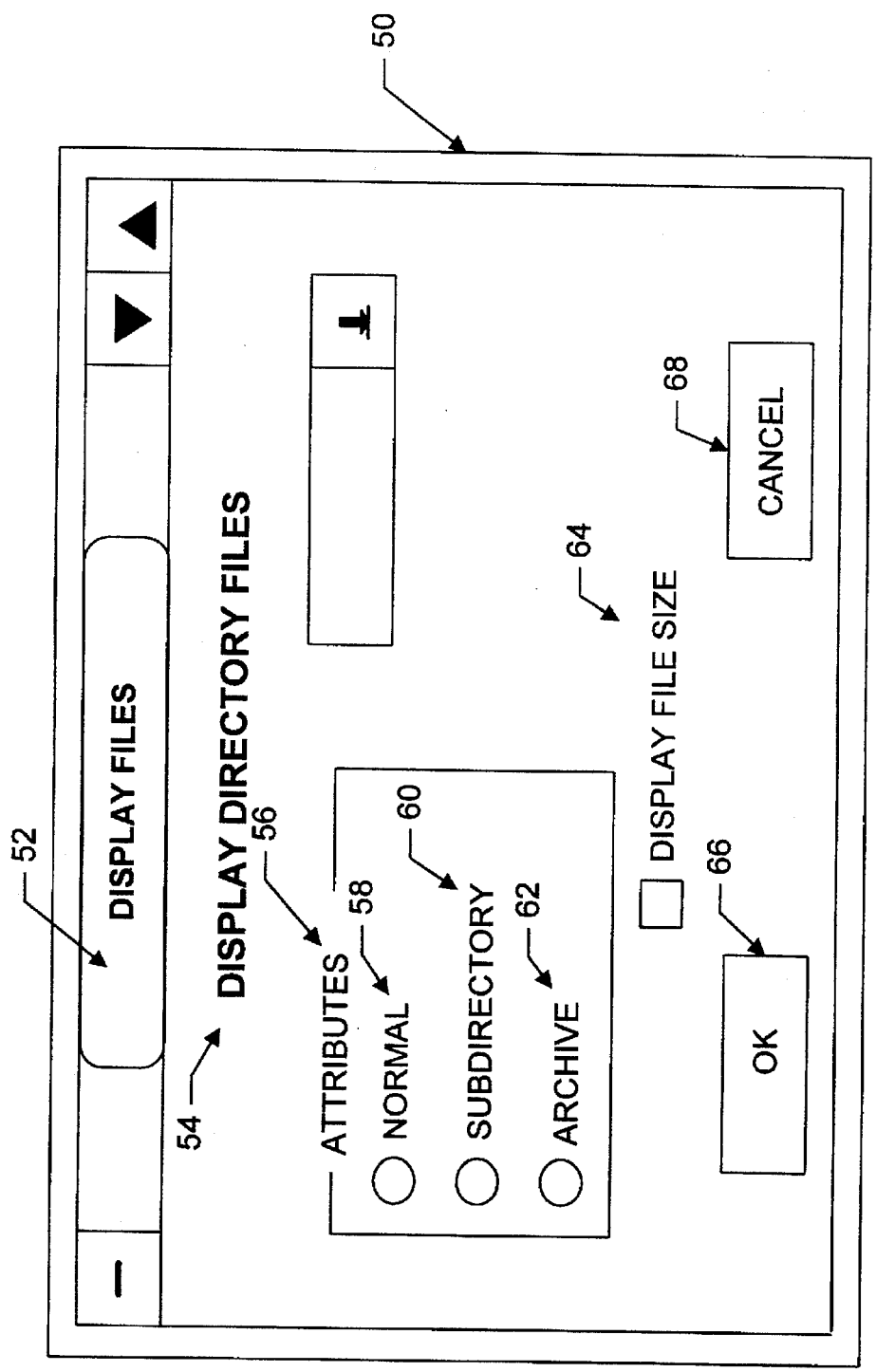
FIG. 2 pictorially depicts a representative display screen generated by an application program.

FIG. 2 depicts a representative screen generated on display 36 by an application program. The screen includes a dialog box 50, with which the user interacts using keyboard 32 and/or position-sensing device 34. As understood by those skilled in the art, this form of interactive display is a standard feature of application software designed to operate in graphical user environments such as International Business Machines OS/2. The dialog box includes a textual title or caption 52, which characterizes the activity associated with or the function performed by dialog box 50; and a series of internal text fields 54, 56, 58, 60, 62, 64, 66, 68, which furnish additional information or enable the user, by "clicking" on or otherwise selecting a field, to execute the feature represented by that field.

If dialog box 50 were implemented in a conventional application program, the text fields and executable code would appear inseparably within a unified run-time compilation. This compilation would ordinarily be stored on a mass storage device 26 (see FIG. 1) and transferred, as a single memory block or series of linked blocks 75, to main memory 22 when initiated by the user. During execution, the instructions in memory block 75 would interact with keyboard 32, position-sensing device 34 and storage devices 26 by means of an operating system 77, which, through CPU 20, directs the execution of low-level, basic system functions such as memory allocation, file management and storage-device operation. At an appropriate stage of program execution, application program 75 would format the stored text and the graphical elements of dialog box 50 to conform to the depicted format, and enter these into a display buffer 79. The contents of display buffer 79 determine what is presented on display 36.

As discussed previously, this mode of operation results in various disadvantages. Thus, in accordance with the present invention, selected or all textual components of application program 75, including the text fields illustrated in FIG. 2, are separately stored in a set of string libraries 82. Instead of directing the display of text embedded in run-time memory, application program 75 issues commands to a string processor 84, which transfers the appropriate text from string libraries 82. String processor 84 and libraries 82 are computationally distinct from application program 75, and can therefore be shared by a number of different application programs. For example, in a multitasking environment, where more than one application can run simultaneously, all active applications can make use of the same string processor and all common string libraries (which therefore must be loaded only once into memory 22).

String libraries 82 preferably include a global string file, which contains textual material common to a variety of applications, so that it is necessary to load only one copy of this text regardless of the number of active applications; a private application string file associated with each active application, which contains textual material associated with that application; and, if appropriate, group private files that contain text common to some, but not all applications. Each character string in each of the string files is identified by a unique number or other suitable identifier. For example, since the "Display Files" dialog box is not common to all applications, the application-specific text fields 54, 56, 58, 60, 62 and 64 would be stored in a private or group private library; however, since the terms "OK" and "Cancel" are ubiquitous across applications, these would be separately stored in the global string library.

The string files themselves contain text encoded in ASCII or other suitable electronic format. A separate file exists for each language into which the text is translated. They may contain only key words, with the remainder embedded or otherwise associated with the application program, or instead contain, in various groupings, every word available for display during program execution. For example, instead of storing entire paragraphs of textual explanation in a string file, it is possible to store only the commonly used terms whose inconsistent translation would be most troublesome, and embed calls to these strings in the bulk translated text. However, greatest efficiency is obtained when all elements of text are stored in string files. The files may also contain multiple versions of different strings, allowing an application to override a previous string version during execution.

The application program is preferably stored with the text partitioned from the executable code; naturally, this organization is substantially facilitated by storage of all text elements in string files, with string-processor commands used for their retrieval and display. In an especially preferred embodiment, a scripting language marks the text (or string-processor commands that retrieve text) to determine its on-screen presentation. This mode of text representation is entirely conventional and well-known to those skilled in the art. In one embodiment, the method of translating and running an application program containing text includes the steps of identifying repeated items of text in the application program and translating the repeated items into a selected language. Each translated repeated item of text is then stored once as a separate character string in a string library. Then, the remaining items of text from the application program are translated and the remaining translated items are stored as separate character strings in the string library. Commands are embedded within the application program and the string processor is response to the commands. During execution of the application program, the commands embedded therein cause the string processor to retrieve designated ones of the character strings from the string library and display the retrieved character strings on a display.

String processor 84 is a reader and formatter that provides text services to applications, which the applications invoke by means of embedded commands to extract text from the appropriate global and private string files, and to display the text. These commands are as follows:

InitStr(cc)—loads the global string file for the designated country into the string libraries memory partition 82.

AddStr (filename)—loads the private or group private string (filename) into the string libraries memory partition 82.

GetStr(id)—retrieves the string indicated by (id).

GetLine(address)—obtains a line from the designated memory address as an asci string.

InitPage—sets page parameters.

ShowPar(arguments)—displays a single paragraph of text. Critical arguments are a paragraph-structure block that specifies a font and the starting paragraph, and that sets forth the actual text; and a "device context," which characterizes the output device on which the text is to be displayed.

ShowPage (arguments)—A special case of ShowPar, this command displays designated text paragraphs grouped into full pages.

DrawLine (arguments)—displays a single specified string. Critical arguments are a device context, the actual string to be drawn, and the x,y-coordinate location on the device where the string is to be drawn. This command can also be used to calculate the length of the line instead of actually rendering it.

SplitLine (arguments)—returns the height of a string when reflowed in a given column using the current font. Critical arguments are the device context, the string, and the width of a column.

In operation, the user embeds these commands within the application command structure prior to compilation. If, as is preferred, all text elements are specified by character strings accessible by GetStr commands, compilation of the program results in a run-time version containing only instructions and no text elements.

The user, in constructing an application program, creates a suitable execution link to string processor 84, so that the above commands are recognized and processed by string processor 84 in the course of program execution. In the application program itself, the user first enters an InitStr command, specifying the country for which the application program is destined. String processor 84 contains a table relating global string files to the appropriate countries (so that, for example, systems bound for the United States, United Kingdom and Australian markets all retrieve the English global string file). The user then enters an AddStr command, retrieving the particular string files associated with the application. (If desired, ddStr files can also be coded with respect to country, so the user need only specify the application and the country to load the appropriate files.) Execution of InitStr and AddStr initializes the strings, permitting subsequent use of the GetStr command.

Figure 3:
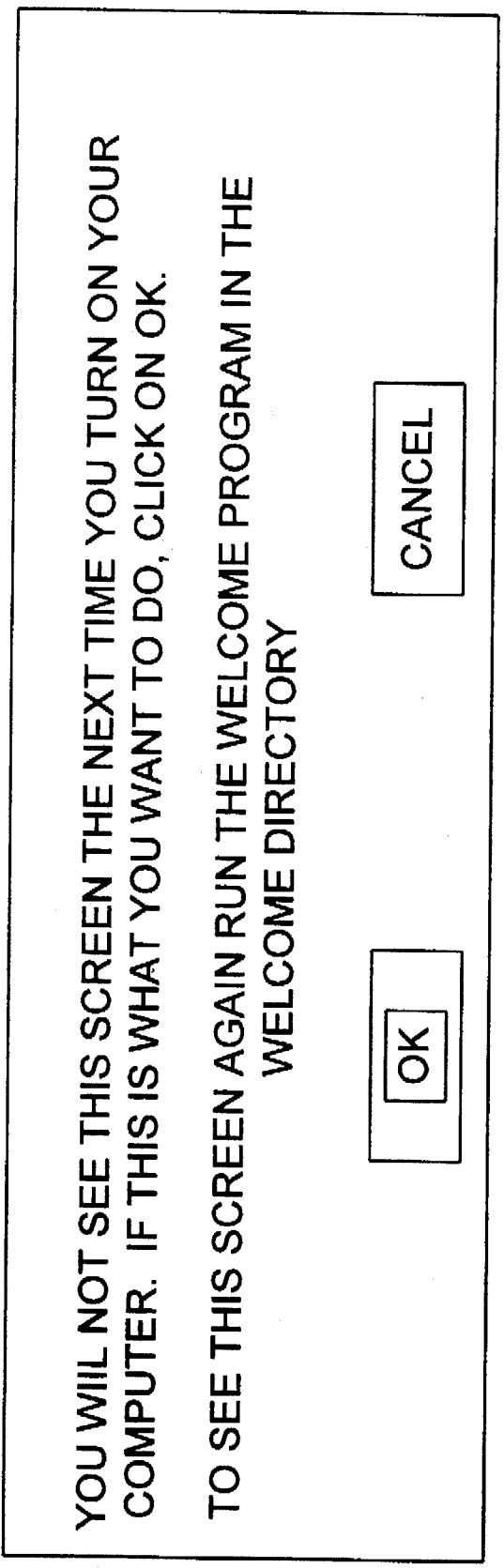
FIG. 3 pictorially depicts another representative display screen, generated in accordance with the present invention.

String processor 84 is straightforwardly implemented in virtually any computer language or environment. The accompanying program-listing appendix sets forth a C implementation of the above-described commands. The command sequence set forth on the final two pages of the program-listing appendix draws the display screen shown in FIG. 3.

It will therefore be seen that the foregoing represents a highly advantageous approach to translation and rendering of text for use with application programs destined for shipment to different countries. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

PROGRAM-LISTING APPENDIX

```
/* BMSubset.c - Compile with Borland C++ v3.1 - don't use v4.0 */ define OEMRESOURCE
include <windows.h>
#include <stdlib.h>
#include <stdio.h>
#include <string.h>
#include <io.h>
#include <dos.h>
#include <errno.h>
#include "bmsubset.h"
#include "dib.h"

HANDLE hLibInst;

/*---------------------------------------*
 * Standard code for library initialization
 *---------------------------------------*/ int FAR PASCAL LibMain (HANDLE hInstance, WORD wDataSeg, WORD wHeapSize,
        LPSTR lpszCmdLine)
{
  hLibInst = hInstance;

if (wHeapSize > 0) {
     UnlockData (0);
  } /* endif */
  return 1;
}

/*---------------------------------------*
 * The structure of paragraphs in memory
 *---------------------------------------*/ struct structPar {        // Paragraph structure:
   char  szIndent[MAXDTLEN];  // text to put in indention; must be 1st for sorting
   int   lIndent;             // how many characters to indent paragraph
   int   iMemOffset;          // offset of paragraph in global memory
   int   iPage;               // page that the paragraph is on
   int   yHeight;             // height of paragraph, in pels
   BOOL  fCompAbove;          // compress the blank line above the paragraph
   BOOL  fHeader;             // true if this paragraph is a header
   char  szFile[MAXPARIDLEN]; // name of file cross-referenced by paragraph
};

/*---------------------------------------*
 * Structure for BM symbols
 *---------------------------------------*/

// The following structure holds all &symbols. that are defined.
// These fall into the following categories:
// 1. OBM bit maps, used by Windows: large positive numbers
// 2. IDB bit maps, included in BMSUBSET.RC; ids are 300 and up
// 3. ANSI characters. Character codes are used, and are under 256.
// 4. Icons. All .ICO files have ids of 0.
// 5. User-defined symbols; ids are negative and index aszUSymbol[].
// 6. Bitmaps loaded from the hard disk, listed in BITMAPS.TBL; id = IDTBL.

struct {
  char  szSymbol[11];
  int   idb;
  short bmWidth;
  short bmHeight;
  BYTE  bmBitsPixel;
  BYTE  bmPlanes;
} aSymbols[MAXNUMSYMBOLS] = {
// Windows Buttons
  {"&maximize.",  IDB_MAXIMIZE} ,
  {"&minimize.",  IDB_MINIMIZE} ,
  {"&restore.",   IDB_RESTORE  } ,
  {"&sysmenu.",   IDB_SYSMENU  } ,
  {"&bsysmenu.",  IDB_BSYSMENU} ,
  {"&ssysmenu.",  IDB_SSYSMENU} ,
  {"&uparrow.",   OBM_UPARROW } ,
  {"&dnarrow.",   OBM_DNARROW } ,
  {"&lfarrow.",   OBM_LFARROW } ,
  {"&rgarrow.",   OBM_RGARROW } ,
  {"&dnarwlin.",  IDB_DNARWLIN} ,
```

```
// Characters inside Windows Buttons
    {"&maxchar.", IDB_MAXCHAR },
    {"&minchar.", IDB_MINCHAR },
    {"&restchar.", IDB_RESTCHAR},
    {"&syschar.", IDB_SYSCHAR },
    {"&bsyschar.", IDB_BSYSCHAR},
    {"&uparchar.", IDB_UPARCHAR},
    {"&dnarchar.", IDB_DNARCHAR},
    {"&lfarchar.", IDB_LFARCHAR},
    {"&rgarchar.", IDB_RGARCHAR},
    {"&dalnchar.", OBM_COMBO },
// Keyboard characters
    {"&upchar.", IDB_UPCHAR },
    {"&downchar.", IDB_DOWNCHAR},
    {"&leftchar.", IDB_LEFTCHAR},
    {"&ritechar.", IDB_RITECHAR},
    {"&entrchar.", IDB_ENTRCHAR},
    {"&pgupchar.", IDB_PGUPCHAR},
    {"&pgdnchar.", IDB_PGDNCHAR},
    {"&homechar.", IDB_HOMECHAR},
// Mouse pointers
    {"&sizens.", IDB_SIZENS },
    {"&sizewe.", IDB_SIZEWE },
    {"&size.",   IDB_SIZE },
    {"&arrow.",  IDB_ARROW },
    {"&wait.",   IDB_WAIT },
// File Mgr
    {"&wfmfold.", IDB_WFMFOLD1},
    {"&wfmexec.", IDB_WFMEXEC1},
    {"&wfmdata.", IDB_WFMDATA1},
    {"&wfmascii.", IDB_WFMASCI1},
    {"&wfmadrv.", IDB_WFMADRV },
    {"&wfmcdrv.", IDB_WFMCDRV },
// Paintbrush
    {"&wptscs.", IDB_WPTSCS },
    {"&wptpbr.", IDB_WPTPBR },
    {"&wpteras.", IDB_WPTERAS },
    {"&wptboxh.", IDB_WPTBOXH },
    {"&wptboxf.", IDB_WPTBOXF },
    {"&wpttext.", IDB_WPTTEXT },
// Other Windows programs
    {"&wcnbell.", IDB_WCNBELL },
// Bookmaster symbols that have characters in the ANSI code page
    {"&asterisk.", IDB_ASTERISK},
    {"&rbl.",   IDB_RBL },
    {"©r.", 0xA9 },
    {"&regtm.", 0xAE },
    {"¼.", 0xBC },
    {"½.", 0xBD },
    {"¾.", 0xBE },
    {"&period.", '.' },
    {"&bullet.", 0xB7 },
    {"&sml.",   ';' },
    {"&colon.", ':' },
    {"&.",   '&' },
    {"&ssq.",   0x27 },
    {">gt.",  0xBB },
    {"<lt.",  0xAB },
// CER ADDITION: color symbols
    {"&hpc=red.", 256 },
    {"&hpc=grn.", 256 },
    {"&hpc=blu.", 256 },
    {"&hpc=yel.", 256 },
    {"&hpc=gry.", 256 },
    {"&hpc=blk.", 256 },
// CER ADDITION: font symbols
    {"&hpf=bld.", 256o },
    {"&hpf=und.", 256o },
    {"&hpf=itl.", 256o },
    {"&hpf=off.", 256o }};
// end CER ADDITION char aszUSymbol[MAXNUMUSYMBOLS][MAXLENUSYMBOLS];

// Global values for language and location of bitmap files & such
char szLanguage[3] = "0";  // two-letter country code, e.g. US
char szWelcomePath[100] = "c:\\welcome\\";

/*─────────────────────────────────────────*
 * GetStr: Get a string of the specified id.              *
 * This is a usefull shell around CopyStr because it uses a local static *
 * string for containing the requested string. All programs that use    *
```

```
*   BMSUBSET should have this copied locally.           *
*   Beware of calling GetStr multiple times in one statement; the 2nd  *
*   call overwrites the results of the 1st call.
*--------------------------------------------------*/ char *GetStr(WORD wID)
{
  static char szGetStr[MAXSTRLEN];

CopyStr (wID, szGetStr);

return szGetStr;
}

/*--------------------------------------------------*
* GetInt:                                           *
* Similar to GetStr, GetInt returns an integer      *
*--------------------------------------------------*/ int GetInt(WORD wID)
{
  return atoi (GetStr (wID));
}

/*--------------------------------------------------*
* GetLineAnsi: Set the Ansi mode for GetLine.       *
* TRUE (the default) means that GetLine will do the OemToAnsi conversion. *
* All text from GetLine will be Ansi codepage.      *
* Symbol resolution is also performed.              *
* FALSE means that GetLine will return Oem code page, with no conversion. *
* You can turn it off just for a moment, but don't leave it off! *
*--------------------------------------------------*/ static BOOL bGetLineAnsi = TRUE;

void FAR PASCAL GetLineAnsi (BOOL bSetting)
{
  bGetLineAnsi = bSetting;
}

// CER CHANGE: comments for GetLine used to be here.  I moved them
//oto immediately before the GetLine() function.  o define TAG_NONE 0
define TAG_P    1
#define TAG_NOTE 2
#define TAG_H3   3
#define TAG_H4   4
#define TAG_UL   10
#define TAG_OL   11
#define TAG_SL   12
#define TAG_DL   13
#define TAG_EUL  20
#define TAG_EOL  21
#define TAG_ESL  22
#define TAG_EDL  23
#define TAG_LI   30
#define TAG_DT   31
#define TAG_DD   32
#define TAG_COMPACT 84
#define TAG_UNRECOGNIZED -2
#define TAG_LINE_TOO_LONG -1
#define TAG_EOF -3
define EOFCHAR 0x1A int iTSize;   // Def List indent size
char szID[MAXIDLEN];  // id=xxx tag contents
char szOriginalLine[MAXLINELEN];  // line that was read from file,
                // with no ansi conversion or symbol substitution /* subroutine to read one character from a file */
char read1char (LPDWORD lplpstr) {
  static char c;
  static int i;

do {
    if (HIWORD ((LONG) lplpstr)) {   // if the file is in memory
```

```
        c = *(LPSTR)(*lplpstr);
        i = 1;
        ((LPSTR) (*lplpstr)) ++;
    } else {   // if file is on disk, extract file handle & read
        i = _lread (LOWORD ( (LONG) lplpstr), &c, 1);
    } /* endif */
} while (c == '\r'); /* enddo */ if (i == HFILE_ERROR || !c) {
    c = EOFCHAR;
    if (HIWORD ((LONG) lplpstr))      // if the file is in memory
        ((LPSTR) (*lplpstr)) --;      // Don't move pointer past end
} /* endif */ return c;

}

/*----------------------------------------------*
 * GetLine:
 * Gets a line from a file as an asciz string, and processes tags.
 *   Also, the standard BM symbols (such as &regtm.) are resolved.
 *   AnsiToOEM conversion is performed.
 * You may pass a DOS file handle of an open file with the format:
 *     iTag = GetLine ((LPDWORD) MAKELONG (filehandle), 0), szLine);
 *   Or you may pass a long pointer to a long pointer to a file image
 *   that has already been read into memory; the pointer will be updated.
 *     iTag = GetLine ((LPDWORD) &lpstr, szLine);
 * There will be 1 trailing space after the text (except for headers).
 * Returns tag constant (defined below) for the tag at the beginning of
 *   the line (if any).
 * Adds TAG_COMPACT to tag value if "compact" keyword is found for lists.
 * If line is longer than MAXLINELEN, returns an error.
 * Returns a null string AND a TAG_EOF if at end of file.
 *   (Returns a TAG_EOF for last line, but not a null string)
 * .* lines are ignored, as are blank lines.
 * .cp lines are returned as null lines with :h3 tags.
 * For dl list, the global variable iTSize is set based on the tsize parm.
 * The global variable szID is always set. If id= is present in a tag, it
 *   is set to the following string. Else it is set to null.
 * Similarly, the global string szOriginalLine is always set to the line
 *   before ANSI conversion and symbol substitution.
 *----------------------------------------------*/
int FAR PASCAL GetLine (LPDWORD lplpstr,  // ptr to ptr to file text
            LPSTR lps)        // string for output
{
    static char s[MAXLINELEN];
    static char szTemp[MAXLINELEN];
    static int i;
    static int iTag;
    static BOOL fCompact;
    static BOOL fSymbol;

static char *szTSize;
    static char szIndent[5];
    static int iSym;
    static char *psz;

fCompact = FALSE;
    szID[0] = '\0';

// Do this loop until I have a nonblank line
    do {

// get the line
        for (i = 0;
             i < MAXLINELEN && (s[i] = read1char (lplpstr)) != EOFCHAR && s[i] != '\n';
             i++) ;

// Return if too long
        if (i == MAXLINELEN) {
            s[MAXLINELEN-1] = '\0';
            lstrcpy (lps, s);
            return TAG_LINE_TOO_LONG;
        } /* endif */

// Return if eof
        if (s[0] == EOFCHAR) {
            lps[0] = '\0';
```

```
        return TAG_EOF;
    } /* endif */ s[i] = '\0';

// Make comments blank lines
    if (s[0] == '.' && s[1] == '') {
        s[0] = '\0';
    } /* endif */

// strip off trailing spaces.
    if (s[0]) {
        for(i = strlen(s) - 1; i >= 0 && s[i] == ' '; i--) {
            s[i] = '\0';
        } /* endfor */
    } /* endif */

// remove leading spaces
    while (s[0] == ' ') {
        strcpy(s, &s[1]);
    } /* endwhile */

} while (!s[0]); /* enddo */

// check for tags
if (s[0] == ':') {
    if (!strncmp(s, ":note.", 6)) {
        strcpy (szTemp, &s[6]);
        strcpy (s, GetStr(IDS_NOTE));
        strcat (s, " ");
        strcat (s, szTemp);
        iTag = TAG_NOTE;
    } else if (!strncmp(s, ":p", 2)) {
        iTag = TAG_P;
    } else if (!strncmp(s, ":ul", 3)) {
        iTag = TAG_UL;
    } else if (!strncmp(s, ":ol", 3)) {
        iTag = TAG_OL;
    } else if (!strncmp(s, ":sl", 3)) {
        iTag = TAG_SL;
    } else if (!strncmp(s, ":dl", 3)) {
        iTag = TAG_DL;

if (szTSize = strstr(s, "tsize=")) {
            szTSize += 6;
            for (i = 0; szTSize[i] >= '0' && szTSize[i] <= '9'; i++) {
                szIndent[i] = szTSize[i];
            } /* endfor */
            szIndent[i] = '\0';
            iTSize = atoi (szIndent);
        } else {
            iTSize = DLINDENT;
        } /* endif */

} else if (!strncmp(s, ":li", 3)) {
        iTag = TAG_LI;
    } else if (!strncmp(s, ":dt", 3)) {
        iTag = TAG_DT;
    } else if (!strncmp(s, ":dd", 3)) {
        iTag = TAG_DD;
    } else if (!strncmp(s, ":eul", 4)) {
        iTag = TAG_EUL;
    } else if (!strncmp(s, ":eol", 4)) {
        iTag = TAG_EOL;
    } else if (!strncmp(s, ":esl", 4)) {
        iTag = TAG_ESL;
    } else if (!strncmp(s, ":edl", 4)) {
        iTag = TAG_EDL;
    } else if (!strncmp(s, ":h3", 3)) {
        iTag = TAG_H3;
    } else if (!strncmp(s, ":h4", 3)) {
        iTag = TAG_H4;
/*  } else if (!strncmp(s, ":bold", 5)) {
        iTag = TAG_BOLD;
    } else if (!strncmp(s, ":italic", 7)) {
        iTag = TAG_ITALIC;
    } else if (!strncmp(s, ":underline", 10)) {
        iTag = TAG_UNDERLINE; */
    } else {
        lstrcpy(lps, s);
        return TAG_UNRECOGNIZED;
```

```
} /* endif */ switch (iTag) {
case TAG_OL:
case TAG_UL:
case TAG_SL:
case TAG_DL:
  fCompact = (strstr(s, " compact") != NULL);
  break;
} /* endswitch */ if (psz = strstr (s, " id=")) {
  psz += 4;
  for (i = 0;
       i < MAXIDLEN   &&
       // CER CHANGE: commented out this: psz[i] != ' ' &&
       psz[i] != '\0' &&
       psz[i] != '.';
       i++) {
    szID[i] = psz[i];
  } /* endfor */
  szID[i] = '\0';
} /* endif */ if (s[0] == '.') {
  if (strchr(s, '.')) {
    strcpy(s, strchr(s, '.') + 1);
  } else {
    s[0] = '\0';
  } /* endif */
} /* endif */

} else {
  if (!strncmp(s, ".cp", 3)) {
    iTag = TAG_H3;
    s[0] = '\0';
  } else if (!strncmp(s, ".br", 3)) {
    strcpy (s, "\n");
    iTag = TAG_NONE;
  } else if (!strncmp(s, ".nameit", 7)) {
    // A nameit line has the format: .nameit symbol=ps text='PS/1'
    strtok (&s[7], " ="); // get past ".nameit symbol="
    szTemp[0] = '&';
    strcpy (&szTemp[1], strtok (NULL, " =")); // get name
    strcat (szTemp, ".");
    for (iSym = 0;
         iSym < MAXNUMSYMBOLS && aSymbols[iSym].szSymbol[0] &&
           strcmp (aSymbols[iSym].szSymbol, szTemp);
         iSym++);
    for (i = 0; i < MAXNUMUSYMBOLS && aszUSymbol[i][0]; i++);
    if (iSym < MAXNUMSYMBOLS && i < MAXNUMUSYMBOLS) {
      // Now have verified there's room in aSymbols and in aszUSymbol
      strcpy (aSymbols[iSym].szSymbol, szTemp);
      aSymbols[iSym].idb = - (i + 1);
      strtok (NULL, " ="); // Get past "text="
      strcpy (aszUSymbol[i], strtok (NULL, "")); // text
      // Following is a new line of code which I have personally
      // inserted at my own risk, and for which I take full
      // responsibility and nothing that happens is Suzanne's fault!
      // But hey, free labor is worth what you paid for it...
      // -- Randy Bertram, 6/8/93, 3:16pm
      OemToAnsi( aszUSymbol[i], aszUSymbol[i] );
    } /* endif */
    s[0] = '\0';
    iTag = TAG_NONE;
  } else {
    iTag = TAG_NONE;
  } /* endif */
} /* endif */

// If end of sentence, add extra trailing space
if (s[0] && strchr (GetStr(IDS_DOUBLE_SPACE_CHARS), s[strlen(s)-1]) ) {
  if (strlen (s) > 2 && s[strlen(s)-1] == '.')
    // if ends with period, find previous non-character
    // if previous non-char is an ampersand, then it's a symbol
    for (i = strlen (s) - 2; s[i] >= '0'; i--) ;
  else
    i = strlen (s);
  if (s[i] != '&')
    strcat(s, " ");
} /* endif */
```

```
// add one extra trailing space to all lines
if (s[0] && iTag != TAG_H3 && iTag != TAG_H4 && s[0] != '\n') {
    strcat (s, " ");
} /* endif */

// remove leading spaces again (if space between tag and text)
while (s[0] == ' ') {
    strcpy(s, &s[1]);
} /* endwhile */ strcpy (szOriginalLine, s);

// Convert to ANSI
if (bGetLineAnsi) {

OemToAnsi (s, s);

// Take care of special characters that have &symbol. symbols
    do {
        fSymbol = FALSE;
        for (iSym = 0; aSymbols[iSym].szSymbol[0]; iSym++) {
            while (aSymbols[iSym].idb && aSymbols[iSym].idb <= 0xFF &&
                   (psz = strstr (s, aSymbols[iSym].szSymbol))) {
                // Symbol is either user-defined or an ANSI character
                if (aSymbols[iSym].idb > 0) {
                    // The .idb is an ANSI character
                    psz[0] = (char) aSymbols[iSym].idb;
                    strcpy (&psz[1], psz + strlen (aSymbols[iSym].szSymbol));
                    fSymbol = TRUE;
                } else {
                    // The .idb is a negative index to a user-defined symbol
                    i = -1 - aSymbols[iSym].idb;
                    strcpy (szTemp, psz + strlen (aSymbols[iSym].szSymbol));
                    strcpy (psz, aszUSymbol[i]);
                    strcat (psz, szTemp);
                    fSymbol = TRUE;
                } /* endif */
            } /* endwhile */
        } /* endfor */

} while (fSymbol); /* enddo */

} /* endif */ if (fCompact) {
    iTag += TAG_COMPACT;
} /* endif */ lstrcpy (lps, s);
return iTag;

}

/*─────────────────────────────────────────*
 * SplitLine:                              *
 * Replaces spaces in szPar with \n to separate lines. *
 * Removes double spaces at ends of lines. *
 * Returns number of lines.                *
 * Returns zero if a word was too wide to fit *
 *─────────────────────────────────────────*/ int FAR PASCAL SplitLine (HDC hdc, LPSTR szPar, int iWidth)
{ static int
        iBegLine,    // Index to beginning of the current line in szPar
        iLineLen,    // How many chars in the current line is so far
        iFitLen,     // How many chars in line have been proven to fit so far
        cLines,      // Number of lines so far
        iTotalExtent,// TextExtent of the entire line so far
        i1stChar,    // Index to beginning of current word within line
        iWord,       // Word index
        iSym;        // Symbol index
        iSpaceExtent;// How many pixels wide is a space
    static char szWord[MAXLINELEN]; // The current word
    static BOOL fResolvedSymbol;
    static LOGFONT lfcer;o// CER ADDITION: stores current font attributes
    TEXTMETRIC tm;oo// CER ADDITION: stores original font attributes
    HFONT hOldFont = NULL;  o// CER ADDITION: handle of previous font
    char lfFacename[LF_FACESIZE]; // CER ADDITION: stores face name
    BOOL bIndexSpace = FALSE;o// CER ADDITION: true if iFitLen has ever
                         o//           indexed a space
```

```
// CER ADDITION: store original font attributes in lfcer structure
GetTextMetrics(hdc, &tm);// get text metrics
GetTextFace(hdc, LF_FACESIZE, lfFaceName); // get face name
strcpy(lfcer.lfFaceName, lfFaceName); // put face name in LOGFONT struct
lfcer.lfHeight = tm.tmHeight;
lfcer.lfPitchAndFamily = tm.tmPitchAndFamily & 0xF0;
// TMPF_FIXED_PITCH bit is set if font has variable pitch
if(tm.tmPitchAndFamily & TMPF_FIXED_PITCH) lfcer.lfPitchAndFamily |= VARIABLE_PITCH;
else lfcer.lfPitchAndFamily |= FIXED_PITCH;
lfcer.lfWeight = tm.tmWeight;
// end CER ADDITION // Get rid of trailing spaces
while (szPar[0] && szPar[lstrlen(szPar) - 1] == ' ') {
    szPar[lstrlen(szPar) - 1] = '\0';
} iSpaceExtent = (int) LOWORD (GetTextExtent (hdc, " ", 1));
iBegLine = 0;
cLines = 1;
iLineLen = 0;

// Loop for each line of output
while (TRUE) { iTotalExtent = 0;

// Loop for each word that fits on current line
    do {

// Return if at end of paragraph. This is the only exit point.
    o   if (!szPar[iBegLine + iLineLen]) {
    o       // CER ADDITION: Delete font if necessary.
    o       if(hOldFont) DeleteObject (SelectObject (hdc, hOldFont));
            // end CER ADDITION
            return cLines;
        } /* endif */

// Say what we've got so far fits, and then move on to next char
    o   iFitLen = iLineLen; // CER COMMENT: iFitLen now indexes char after last word.
        iLineLen++;

// Skip over double spaces. CER CHANGE: added "&& szPar[...]" in if()
        if (szPar[iBegLine + iLineLen] == ' ' && szPar[iBegLine + iFitLen] == ' ') {
            iLineLen++;
        } /* endif */

// Go to next space or to end of string, so iLineLen
        // will point to the end of the current word
        while (szPar[iBegLine + iLineLen] &&
ooszPar[iBegLine + iLineLen] != ' ' &&
oo_fstrncmp(szPar + iBegLine + iLineLen, "&hp", 3) && // CER ADDITION
ooszPar[iBegLine + iLineLen] != '.') { // CER ADDITION: force
    o       iLineLen++;oooo    // any "&hpx=xxx." into word
        } /* endwhile */          // by itself o // CER ADDITION: If iLineLen is indexing a ' ', set bIndexSpace
    o if(szPar[iBegLine + iLineLen] == ' ') bIndexSpace = TRUE;

o // CER ADDITION: If iLineLen is indexing a '.', make it index next
        // character.
    o   if(szPar[iBegLine + iLineLen] == '.')
    o   {
    o       iLineLen++;
    o       if(szPar[iBegLine + iLineLen] == ' ') bIndexSpace = TRUE;
        }
        // end CER ADDITION // Set i1stChar to the 1st character of the current word
        for (i1stChar = iFitLen; szPar[iBegLine + i1stChar] == ' '; i1stChar++) ;

// If the word starts with carrier returns, process them
        if (szPar[iBegLine + i1stChar] == '\n') {
            while (szPar[iBegLine + i1stChar] == '\n') {
                cLines++;
                i1stChar++;
            } /* endwhile */
            iBegLine += i1stChar;
            iLineLen -= i1stChar;
            i1stChar = iFitLen = iTotalExtent = 0;
        } /* endif */
```

```
    // Get the current word into szWord
    for (iWord = 0; iWord < iLineLen - i1stChar; iWord++)
        szWord[iWord] = szPar[iBegLine + i1stChar + iWord];
    szWord[iWord] = '\0';

// See if there are any symbols in the word
    fResolvedSymbol = FALSE;
    if (strchr (szWord, '&')) {
        // For performance, don't bother with words without &'s
        // Now check the word for any number of occurances of each symbol.
        for (iSym=0; aSymbols[iSym].idb; iSym++) {
            while (strstr (szWord, aSymbols[iSym].szSymbol)) {

// Add the number of spaces for the symbol name
oo              if(aSymbols[iSym].idb != 256)  // CER ADDITION: added if()
oo   oooo //        to ignore color & font symbols
oo              iTotalExtent += ( (aSymbols[iSym].bmWidth / iSpaceExtent)
oooo                 + 2) * iSpaceExtent;
oo              // CER ADDITION: modify font if "&hpf" is found
oo              else if(lstrncmp(aSymbols[iSym].szSymbol, "&hpf", 4))
                {
oo                  // determine new font
oo                  if(lstrcmp(aSymbols[iSym].szSymbol,"&hpf=bld."))
ooolfcer.lfWeight = FW_ULTRABOLD;
oo                  else if(lstrcmp(aSymbols[iSym].szSymbol,"&hpf=und."))
ooolfcer.lfUnderline = TRUE;
oo                  else if(lstrcmp(aSymbols[iSym].szSymbol,"&hpf=itl."))
ooolfcer.lfItalic = TRUE;
oo                  else if(lstrcmp(aSymbols[iSym].szSymbol,"&hpf=off."))
oo                  o{
                        // reset font to original state
ooolfcer.lfWeight = tm.tmWeight;
ooolfcer.lfUnderline = tm.tmUnderlined;
ooolfcer.lfItalic = tm.tmItalic;
ooo}
oo                  // change active font
oo                  if(hOldFont) DeleteObject (SelectObject (hdc, hOldFont));
oo                  hOldFont = SelectObject (hdc, CreateFontIndirect(&lfcer));
oo                  iSpaceExtent = (int) LOWORD (GetTextExtent (hdc, " ", 1));
oo              }
                // end CER ADDITION // Eliminate symbol from word
                strcpy (strstr (szWord, aSymbols[iSym].szSymbol),
                    strstr (szWord, aSymbols[iSym].szSymbol) +
                    strlen (   aSymbols[iSym].szSymbol) );

fResolvedSymbol = TRUE;

} /* endwhile */

} /* endfor */

} /* endif */ if (fResolvedSymbol) {
        // Add the space for other characters in the word
        for (iWord = 0; szPar[iBegLine + iFitLen + iWord] == ' '; iWord++) {
            strcat (szWord, " "); // add spaces before word
        } /* endfor */
        iTotalExtent +=
            (int) LOWORD (GetTextExtent (hdc, szWord, strlen (szWord)));
    } else {
        // If no symbol name processed, add the width of the new word
        // along with the preceding space character.
        iTotalExtent += (int)
            LOWORD (GetTextExtent (hdc,
                &szPar[iBegLine + iFitLen],
                iLineLen - iFitLen));
    } /* endif */

} while ( iTotalExtent < iWidth ); /* enddo */ if (bIndexSpace) { // CER CHANGE: bIndexSpace use to be iFitLen
    return 0; // a word didn't fit on one line
} /* endif */

// Multiple spaces can result in space at beginning of line that must
// be put at end of previous line.
while (szPar[iBegLine + iFitLen + 1] == ' ') {
    iFitLen++;
```

```
    } /* endwhile */

// CER ADDITION: Since iFitlen may no longer be indexing a space
    //   because of my earlier modification, go back until it does.
    //   If this causes a problem, I could try using _fstrncpy to give me
    //   a place to put a '\n'.
    while(szPar[iBegLine + iFitLen] != ' ' && iFitLen) iFitLen--;
    // end CER ADDITION // Now iFitLen indexes the space that should become a \n.
    szPar[iBegLine + iFitLen] = '\n';

// Prepare for next line.
    cLines++;
    iBegLine += iFitLen + 1;
    iLineLen = 0;
    bIndexSpace = FALSE;

} /* endwhile */
}

// Routine to reset everything before exiting in error situations
#define DIE(ERRSTR, ERRTXT) CopyRect (&ppg->rectDst, prect);\
    Die (ppg, hdc, hFont, ERRSTR, hFileText, ERRTXT)

void Die(STRUCTBMPAGE FAR *ppg, HDC hdc, HFONT hFont, int iErrStr,
    GLOBALHANDLE hFileText, char *szErrText)
{
    static char szTemp[sizeof ppg->szIPError];

DeleteObject (SelectObject (hdc, hFont));

strcpy (szTemp, GetStr(iErrStr));
    strcat (szTemp, "\n");
    strncat (szTemp, szErrText, sizeof ppg->szIPError - strlen (szTemp) - 1);
    lstrcpy (ppg->szIPError, szTemp);
//  DrawText (hdc, ppg->szIPError, -1, &ppg->rectDst,
//      DT_WORDBREAK | DT_CENTER | DT_VCENTER | DT_NOPREFIX);

GlobalUnlock (ppg->hPageText);
    GlobalFree (ppg->hPageText);
    ppg->hPageText = 0;
    GlobalUnlock (ppg->hParagraph);  o// CER CHANGE: LocalUnlock to GlobalUnlock
    GlobalFree (ppg->hParagraph);    o// CER CHANGE: LocalFree to GlobalFree
    if ((ppg->wPFlags & IP_MEM)) {
        GlobalUnlock (hFileText);
        GlobalFree (hFileText);
    } /* endif */
}

/*---------------------------------------------------------------*
* initPage:                                                      *
* Sets up a page in memory so that ShowPage or ShowPar can be called. *
* Returns number of subpages; or 0 if not enough memory to proceed. *
* The number of pages is 1-based. If there is one page, 1 is returned. *
*   (This page would be PAGE ZERO to ShowPage.)                  *
* If there is an error, prints error message in middle of rectangle. *
* A STRUCTBMPAGE structure must be defined and passed to all ___Page *
*   routines. You must have multiple structures for more than one *
*   page at a time on the screen. The following code (or something *
*   similar) must be used to initialize the structure.           *
*                                                                *
*     pg.hInstance = hInstance; // caller's instance             *
*     pg.hPageText = 0;      // say page doesn't exist yet       *
*     pg.lf.lfHeight = 16;   // define font to be used           *
*     pg.lf.lfPitchAndFamily = VARIABLE_PITCH | FF_SWISS;        *
*     strcpy (pg.lf.lfFaceName, "System");                       *
*                                                                *
* The flags for InitPage are:                                    *
*   IP_RECT  - Draw a rectangle around the text                  *
*   IP_SKIPH3 - Do not display the text for the first :h3. tag   *
*   IP_MEM   - File is already in memory; szFile points to a file *
*              image rather than the name of a file to open.     *
*   IP_CONT  - Make one continuous page; don't remove blank lines *
*              between paragraphs on page boundaries. This is    *
*              usually used for pages that will be ShowPar'd.    *
*              The PageShown structure in the StructBMPage is    *
*              not set up when IP_CONT is used, so that the number *
```

```
 *      of pages can exceed MAXNUMPAGES.
 *_____*/
int FAR PASCAL InitPage (STRUCTBMPAGE FAR *ppg,  // Pre-initialized struct
            HDC hdc,    // Device context handle
            LPRECT prect, // rectangle to contain text
            LPSTR szFile, // file name or file contents
            WORD wFlags)  // 0 or combo of flags listed above
{
    static char szPar[MAXPARLEN];
    static char szLine[MAXLINELEN];
    static int iTag, cxChar, cyChar;
    static TEXTMETRIC tm;
    static int yDstHeight;
    static BOOL fCompact;
    static int iListMode;
    static int iListNum;
    static int iPageNum, yPageHeight, iPageMemOffset;
    static int hFile;
    static HFONT hFont, hFont2;
    static LPSTR lpPageText, lpFileText;
    static long lFileLength;
    static GLOBALHANDLE hFileText;
    static struct structPar *Paragraph;
    static char szTemp[MAXDTLEN];
    static int yIndHeight;
    static char szNum[5];
    static WORD w;

ppg->szIPError[0] = '\0';

hFont = SelectObject (hdc, CreateFontIndirect (&ppg->lf));
    GetTextMetrics (hdc, &tm);
    cxChar = tm.tmAveCharWidth;
    cyChar = tm.tmHeight + tm.tmExternalLeading;

// Initialize things based on input parms
    ppg->wIPFlags = wFlags;
    CopyRect (&ppg->rectDst, prect);

if ((ppg->rectDst.bottom - ppg->rectDst.top < MINHEIGHT) ||
        (ppg->rectDst.right - ppg->rectDst.left < MINWIDTH )) {
        return 0;
    } /* endif */
    ppg->rectDst.top    += TOPMARG;
    ppg->rectDst.bottom -= BOTTOMMARG;
    ppg->rectDst.left   += LEFTMARG;
    ppg->rectDst.right  -= RIGHTMARG;

yDstHeight = (ppg->rectDst.bottom - ppg->rectDst.top + 1);

if (wFlags & IP_MEM) {
        lpFileText = szFile;
        for (lFileLength = 0; lpFileText[lFileLength]; lFileLength++) ;
        lFileLength++;
    } else {
        hFile = _lopen(szFile, OF_READ);
        if (hFile == -1) {
            DeleteObject (SelectObject (hdc, hFont));
            lstrcpy (ppg->szIPError, GetStr(IDS_FILERR));
//          DrawText (hdc, ppg->szIPError, -1, &ppg->rectDst,
//              DT_WORDBREAK | DT_CENTER | DT_VCENTER | DT_NOPREFIX);
// used to be commented out
            DrawText (hdc, ppg->szIPError, -1, &ppg->rectDst,
                DT_WORDBREAK | DT_CENTER | DT_VCENTER | DT_NOPREFIX);
            return 0;
        } /* endif */

// Get enough memory to store temporary copy of file.
        // Temporary copy of file is owned by calling program
        hFileText = GlobalAlloc (GHND, (lFileLength = filelength (hFile)) + 1);
        if (!hFileText) {
            DeleteObject (SelectObject (hdc, hFont));
            lstrcpy (ppg->szIPError, GetStr(IDS_MEMERR));
//          DrawText (hdc, ppg->szIPError, -1, &ppg->rectDst,
//              DT_WORDBREAK | DT_CENTER | DT_VCENTER | DT_NOPREFIX);
// used to be commented out
            DrawText (hdc, ppg->szIPError, -1, &ppg->rectDst,
                DT_WORDBREAK | DT_CENTER | DT_VCENTER | DT_NOPREFIX);
            _lclose (hFile);
            return 0;
        } /* endif */
        lpFileText = GlobalLock (hFileText);
```

```
    _lread (hFile, lpFileText, LOWORD(lFileLength));
    _lclose (hFile);
    lpFileText[lFileLength] = '\0';
} /* endif */
for (w = LOWORD(lFileLength) - 1; lpFileText[w] == EOFCHAR ||
                    lpFileText[w] == '\0'    ||
                    lpFileText[w] == '\n'    ||
                    lpFileText[w] == '\c'   ;  w--) {
    lpFileText[w] = '\0';
} /* endfor */

// Get enough memory to store entire file. I'll actually use less.
// Memory allocated is held by calling program
ppg->hPageText = GlobalAlloc (GHND, lFileLength);
if (!ppg->hPageText) {
    DeleteObject (SelectObject (hdc, hFont));
    lstrcpy (ppg->szlPError, GetStr(IDS_MEMERR));
//  DrawText (hdc, ppg->szlPError, -1, &ppg->rectDst,
//      DT_WORDBREAK | DT_CENTER | DT_VCENTER | DT_NOPREFIX);
    if (!(wFlags & IP_MEM)) {
        GlobalUnlock (hFileText);
        GlobalFree (hFileText);
    } /* endif */
    return 0;
} /* endif */
lpPageText = GlobalLock (ppg->hPageText);

o// Get memory for paragraph structure
o// CER CHANGE: LocalAlloc to GlobalAlloc
oppg->hParagraph = GlobalAlloc (GHND, sizeof *Paragraph);
if (!ppg->hParagraph) {
    DeleteObject (SelectObject (hdc, hFont));
    lstrcpy (ppg->szlPError, GetStr(IDS_MEMERR));
//  DrawText (hdc, ppg->szlPError, -1, &ppg->rectDst,
//      DT_WORDBREAK | DT_CENTER | DT_VCENTER | DT_NOPREFIX);
    GlobalUnlock (ppg->hPageText);
    GlobalFree (ppg->hPageText);
    if (!(wFlags & IP_MEM)) {
        GlobalUnlock (hFileText);
        GlobalFree (hFileText);
    } /* endif */
    return 0;
} /* endif */
Paragraph = (void *) GlobalLock (ppg->hParagraph); o// CER CHANGE: LocalLock to GlobalLock // set up variables for line loop
szPar[0] = '\0';
fCompact = FALSE;
iListMode = TAG_NONE;
lPageNum = 0;
yPageHeight = 0;
ppg->cParagraph = 0;
lPageMemOffset = 0;
ppg->PageShown[0].szLine[0] = '\0';
ppg->PageShown[0].szFile[0] = '\0';

// line loop:
do { iTag = GetLine ((LPDWORD) &lpFileText, szLine);

if (iTag >= TAG_COMPACT) {
        iTag -= TAG_COMPACT;
        fCompact = TRUE;
    } /* endif */

// Special processing for DD tag
    if (iTag == TAG_DD) {
        /* remove trailing space from paragraph */
        if (szPar[0] && szPar[strlen(szPar)-1] == ' ') {
            szPar[strlen(szPar)-1] = '\0';
        } /* endif */
        // Make sure paragraph so far (DT) is not too long for indent string
        if (strlen (szPar) >= MAXDTLEN) {
            DIE(IDS_LDTERR, szPar);
            return 0;
        } /* endif */
        // Copy paragraph into indent string; it will be the def term
        lstrcpy ((Paragraph + ppg->cParagraph)->szIndent, szPar);
        // Zero out paragraph but don't start a new one.
        szPar[0] = '\0';
```

```
} /* endif */

// For any tag or eof, flush the paragraph accumulated so far
if (iTag && szPar[0]) {

/* remove trailing space from paragraph */
    if (szPar[0] && szPar[strlen(szPar)-1] == ' ') {
        szPar[strlen(szPar)-1] = '\0';
    } /* endif */ o   // see how high the text is
    (Paragraph + ppg->cParagraph)->yHeight =
o   SplitLine (hdc, szPar, ppg->rectDst.right - ppg->rectDst.left) * cyChar;

// if a word was too wide to fit in the window, die
    if (!(Paragraph + ppg->cParagraph)->yHeight) {
        DIE(IDS_WRDERR, szPar);
        return 0;
    } /* endif */ if (iListMode == TAG_DL) { strcpy(szTemp, (Paragraph + ppg->cParagraph)->szIndent);

// see how high the def term is
        yIndHeight = SplitLine (hdc, szTemp,
                     (iTSize-1) * cxChar) * cyChar;
        strcpy((Paragraph + ppg->cParagraph)->szIndent, szTemp);
        // if a word was too wide to fit in the term column, die
        if (!yIndHeight) {
            DIE(IDS_TRMERR, szTemp);
            return 0;
        } /* endif */

// If term is higher than definition, use term height
        if (yIndHeight > (Paragraph + ppg->cParagraph)->yHeight) {
            (Paragraph + ppg->cParagraph)->yHeight = yIndHeight;
        } /* endif */

} /* endif */

// If it's too high to fit in window, die
    if ((Paragraph + ppg->cParagraph)->yHeight > yDstHeight) {
        DIE(IDS_PTHERR, szPar);
        return 0;
    } /* endif */

// If I'm on a new page, no blank line above
    // This could be for starting a new page, or the first page
    if (!ppg->cParagraph || (yPageHeight == 0 && !(wFlags & IP_CONT))) {
        (Paragraph + ppg->cParagraph)->fCompAbove = TRUE;
    } /* endif */

// If paragraph won't fit on subpage, go to next subpage
    if (yPageHeight + (Paragraph + ppg->cParagraph)->yHeight
        + ((Paragraph + ppg->cParagraph)->fCompAbove ? 0 : cyChar)
        > yDstHeight) {
        iPageNum++;
        if (iPageNum == MAXNUMPAGES && !(wFlags & IP_CONT)) {
            DIE(IDS_PAGERR, "");
            return 0;
        } /* endif */
        yPageHeight = 0;
        if (!(wFlags & IP_CONT)) {
            ppg->PageShown[iPageNum].szLine[0] = '\0';
            lstrcpy (ppg->PageShown[iPageNum].szFile, ppg->PageShown[iPageNum-1].szFile);
        } /* endif */
    } /* endif */

// Once again, if I'm on a new page, no blank line above
    if (!ppg->cParagraph || (yPageHeight == 0 && !(wFlags & IP_CONT))) {
        (Paragraph + ppg->cParagraph)->fCompAbove = TRUE;
    } /* endif */

// Update total page height now.
    yPageHeight += (Paragraph + ppg->cParagraph)->yHeight;
    if (!(Paragraph + ppg->cParagraph)->fCompAbove) {
        yPageHeight += cyChar;
    } /* endif */

// Set up rest of Paragraph structure
o   (Paragraph + ppg->cParagraph)->iMemOffset = iPageMemOffset;
    (Paragraph + ppg->cParagraph)->iPage      = iPageNum;
```

```
                (Paragraph + ppg->cParagraph)->fHeader    = FALSE;

// copy paragraph text to global memory
        if ((int) LOWORD (GlobalSize (ppg->hPageText)) <
            iPageMemOffset + strlen (szPar) + 1) {
            if (!GlobalReAlloc (ppg->hPageText,
                    iPageMemOffset + strlen (szPar) + 1,
                    GHND) ) {
                DIE(IDS_MEMERR, " ");
                return 0;
            } /* endif */
        } /* endif */
        lstrcpy (lpPageText + iPageMemOffset, szPar);
        iPageMemOffset += strlen(szPar) + 1;

if (iTag != TAG_EOF) {
            // Start a new paragraph
            szPar[0] = '\0';
            ppg->cParagraph++;
            GlobalUnlock (ppg->hParagraph);// CER CHANGE: LocalUnlock to GlobalUnlock
            if (!GlobalReAlloc (ppg->hParagraph,  // CER CHANGE: LocalReAlloc to GlobalReAlloc
                    (ppg->cParagraph + 1) * sizeof *Paragraph,
                    GHND) ) {
                DIE(IDS_MEMERR, " ");
                return 0;
            } /* endif */
            Paragraph = (void *) GlobalLock (ppg->hParagraph);// CER CHANGE: LocalLock to GlobalLock
            (Paragraph + ppg->cParagraph)->iIndent = 0;
            (Paragraph + ppg->cParagraph)->fCompAbove = FALSE;
        } /* endif */

} /* endif */

// CER CHANGE: Changed following strcpy to strncpy
    if (iTag && iTag != TAG_EOF && iTag != TAG_DD) {
        strncpy ( (Paragraph + ppg->cParagraph)->szFile, szID, MAXPARIDLEN);
    } /* endif */ switch (iTag) { case TAG_LINE_TOO_LONG:
        DIE(IDS_LINERR, szLine);
        return 0;
    case TAG_UNRECOGNIZED:
        DIE(IDS_TAGERR, szLine);
        return 0;

case TAG_P:
    case TAG_NOTE:
        switch (iListMode) {
        case TAG_UL:
            (Paragraph + ppg->cParagraph)->iIndent = ULINDENT;
            break;
        case TAG_OL:
            (Paragraph + ppg->cParagraph)->iIndent = OLINDENT;
            break;
        case TAG_SL:
            (Paragraph + ppg->cParagraph)->iIndent = SLINDENT;
            break;
        } /* endswitch */
        (Paragraph + ppg->cParagraph)->fCompAbove = FALSE;
        break;

case TAG_H3:
    case TAG_H4:

/*---------------------------------------------------*
 * Note: Header tags are unique. Most tags do two things with regard *
 * to paragraph boundaries:                          *
 * 1. End the current paragraph with the preceding line. *
 * 2. Begin a new paragraph with the text following the tag on the *
 *    current line.                                  *
 * Headers do three things:                          *
 * 1. End the current paragraph with the preceding line. *
 * 2. Make an individual paragraph of the current line. *
 * 3. Begin a new paragraph with the NEXT line.      *
 * Item 1 is done at the top of the line loop for all tags. For *
 * headers, most of the logic for 1 must be repeated for 3. Hence, *
 * a lot of the code for 1 is duplicated below.      *
 *---------------------------------------------------*/
```

```
// mark this paragraph as a header
(Paragraph + ppg->cParagraph)->fHeader = TRUE;

// remove trailing space
if (szLine[0] && szLine[strlen(szLine)-1] == ' ') {
    szLine[strlen(szLine)-1] = '\0';
} /* endif */

// If header is all spaces, treat it as null
if (!strcspn (szLine, " ") || !strcmp (szLine, "&rbl.")) {
    szLine[0] = '\0';
} /* endif */

// If I'm not on a new page, go to new page for h3's
if (yPageHeight != 0 && iTag == TAG_H3) {
    iPageNum++;
    if (iPageNum == MAXNUMPAGES && !(wFlags & IP_CONT)) {
        DIE(IDS_PAGERR, " ");
        return 0;
    } /* endif */
    yPageHeight = 0;
} /* endif */

// For h3's only, update the PageShown structure
if (iTag == TAG_H3 && !(wFlags & IP_CONT)) {
    lstrcpy (ppg->PageShown[iPageNum].szLine, szLine);
    lstrcpy (ppg->PageShown[iPageNum].szFile, szID);
} /* endif */
else if (iTag == TAG_H3 && (wFlags & IP_CONT)) // CER ADDITION
    lstrcpy (ppg->szProgram, szID);

// For the SKIPH3 flag, make h3's null
if ((iTag == TAG_H3) && (ppg->wIPFlags & IP_SKIPH3)) {
    szLine[0] = '\0';
} /* endif */

// If there's no text, quit now.
if (!szLine[0]) {
    break;
} /* endif */ if (ppg->lfh.lfHeight) {
    // Select special font for headers
    hFont2 = SelectObject (hdc, CreateFontIndirect (&ppg->lfh));
    GetTextMetrics (hdc, &tm);
    cxChar = tm.tmAveCharWidth;
    cyChar = tm.tmHeight + tm.tmExternalLeading;
} /* endif */ if (ppg->wIPFlags & IP_H3DEF && szLine[0] == '&') {
    static int i;
    // Make header into a pseudo definition list // Move &symbol. into the indentation string
    for (i = 0; i ? szLine[i-1] != '.' : TRUE; i++) {
        (Paragraph + ppg->cParagraph)->szIndent[i] = szLine[i];
    } /* endfor */
    (Paragraph + ppg->cParagraph)->szIndent[i+1] = '\0';
    for ( ; szLine[i] == ' '; i++) ;
    strcpy (szLine, &szLine[i]);

// find out how much to indent, using length of string as default
    (Paragraph + ppg->cParagraph)->iIndent =
        strlen ((Paragraph + ppg->cParagraph)->szIndent) + 2;
    for (i=0; aSymbols[i].idb; i++)
        if (!strcmp ((Paragraph + ppg->cParagraph)->szIndent,
            aSymbols[i].szSymbol))
            (Paragraph + ppg->cParagraph)->iIndent = 3 +
                aSymbols[i].bmWidth / cxChar;

// Set the height of the header, using indent margins
    (Paragraph + ppg->cParagraph)->yHeight =
        SplitLine (hdc, szLine, ppg->rectDst.right - ppg->rectDst.left
            - (Paragraph + ppg->cParagraph)->iIndent * cxChar)
        * cyChar;

} else {
    // Don't indent unless IP_H3DEF and it's a bitmap
    (Paragraph + ppg->cParagraph)->iIndent = 0;

// Set the height of the header
    (Paragraph + ppg->cParagraph)->yHeight =
```

```
o   SplitLine (hdc, szLine, ppg->rectDst.right - ppg->rectDst.left)
        * cyChar;
    } /* endif */

// if a word was too wide to fit in the window, die
    if (!(Paragraph + ppg->cParagraph)->yHeight) {
        DIE(IDS_WRDERR, szLine);
        return 0;
    } /* endif */

// If h4 won't fit on subpage, go to next subpage
    if (iTag == TAG_H4 &&
        yPageHeight + (Paragraph + ppg->cParagraph)->yHeight + cyChar
            > yDstHeight) {
        iPageNum++;
        if (iPageNum == MAXNUMPAGES && !(wFlags & IP_CONT)) {
            DIE(IDS_PAGERR, " ");
            return 0;
        } /* endif */
        yPageHeight = 0;
        if (!(wFlags & IP_CONT)) {
            ppg->PageShown[iPageNum].szLine[0] = '\0';
            lstrcpy (ppg->PageShown[iPageNum].szFile, ppg->PageShown[iPageNum-1].szFile);
        } /* endif */
    } /* endif */

// If I'm on a new page, no blank line above
    // This could be for starting a new page, or the first page
    if (!ppg->cParagraph || (yPageHeight == 0 && !(wFlags & IP_CONT))) {
        (Paragraph + ppg->cParagraph)->fCompAbove = TRUE;
    } /* endif */

// Update total page height now.
    yPageHeight += (Paragraph + ppg->cParagraph)->yHeight;
    if (!(Paragraph + ppg->cParagraph)->fCompAbove) {
        yPageHeight += cyChar;
    } /* endif */

// set up rest of paragraph structure
    (Paragraph + ppg->cParagraph)->iMemOffset = iPageMemOffset;
    (Paragraph + ppg->cParagraph)->iPage      = iPageNum;

// copy header text to global memory
    if ((int) LOWORD (GlobalSize (ppg->hPageText)) <
        iPageMemOffset + strlen (szLine) + 1) {
        if (!GlobalReAlloc (ppg->hPageText,
                    iPageMemOffset + strlen (szLine) + 1,
                    GHND) ) {
            DIE(IDS_MEMERR, " ");
            return 0;
        } /* endif */
    } /* endif */
    lstrcpy (lpPageText + iPageMemOffset, szLine);
    iPageMemOffset += strlen(szLine) + 1;
    szLine[0] = '\0';

// Undo the special font selected for headers
o   if (ppg->lfh.lfHeight) {
o       DeleteObject (SelectObject (hdc, hFont2));
o       hFont2 = NULL; o// CER ADDITION: lets me know that special
o       ooo// header font isn't being used
        GetTextMetrics (hdc, &tm);
        cxChar = tm.tmAveCharWidth;
o       cyChar = tm.tmHeight + tm.tmExternalLeading;
    } /* endif */

// Start a new paragraph
    ppg->cParagraph++;
    GlobalUnlock (ppg->hParagraph); o// CER CHANGE: LocalUnlock to GlobalUnlock
ooo if (!GlobalReAlloc (ppg->hParagraph, o// CER CHANGE: LocalReAlloc to GlobalReAlloc
                (ppg->cParagraph + 1) * sizeof *Paragraph,
oooooooo GHND)) {
        DIE(IDS_MEMERR, " ");
        return 0;
    } /* endif */
    Paragraph = (void *) GlobalLock (ppg->hParagraph); o// CER CHANGE: LocalLock to GlobalLock
    (Paragraph + ppg->cParagraph)->iIndent    = 0;
    (Paragraph + ppg->cParagraph)->fCompAbove = FALSE;
    (Paragraph + ppg->cParagraph)->fHeader    = FALSE;

break;

case TAG_UL:
```

```
case TAG_OL:
case TAG_SL:
case TAG_DL:
  if (iListMode) {
    DIE(IDS_NSTERR, " ");
    return 0;
  } /* endif */
  iListMode = iTag;
  iListNum = 0;
  switch (iTag) {
  case TAG_OL:
    ppg->rectDst.left += OLINDENT * cxChar;
    break;
  case TAG_SL:
    ppg->rectDst.left += SLINDENT * cxChar;
    break;
  case TAG_UL:
    ppg->rectDst.left += ULINDENT * cxChar;
    break;
  case TAG_DL:
    ppg->rectDst.left += iTSize * cxChar;
    break;
  } /* endswitch */
  break;

case TAG_EUL:
case TAG_EOL:
case TAG_ESL:
case TAG_EDL:
case TAG_EOF:
  iListMode = TAG_NONE;
  ppg->rectDst.left = prect->left + LEFTMARG;
  fCompact = FALSE;
  break;

case TAG_LI:
case TAG_DT:
  // first eliminate blank above if item is in compact list
  if (iListNum) {
    (Paragraph + ppg->cParagraph)->fCompAbove = fCompact;
  } iListNum++; // Keep running count in all lists

// Then set the indent character to the bullet or whatever
  switch (iListMode) {
  case TAG_UL:
    strcpy((Paragraph + ppg->cParagraph)->szIndent, GetStr(IDS_BULLET));
    (Paragraph + ppg->cParagraph)->iIndent = ULINDENT;
    break;
  case TAG_OL:
    itoa(iListNum, szNum, 10);
    strcat(szNum, GetStr(IDS_NUMSUF));
    strcpy((Paragraph + ppg->cParagraph)->szIndent, szNum);
    (Paragraph + ppg->cParagraph)->iIndent = OLINDENT;
    break;
  case TAG_SL:
    (Paragraph + ppg->cParagraph)->szIndent[0] = '\0';
    (Paragraph + ppg->cParagraph)->iIndent = SLINDENT;
    break;
  case TAG_DL:
    // indent the paragraph, but szIndent will be filled at :dd time
    (Paragraph + ppg->cParagraph)->iIndent = iTSize;
    break;
  } /* endswitch */
  break;

case TAG_DD:
  break;

} /* endswitch */ if (strlen(szPar) + strlen(szLine) >= MAXPARLEN) {
  DIE(IDS_PARERR, szLine);
  return 0;
} /* endif */ strcat(szPar, szLine);

} while (iTag != TAG_EOF); /* enddo */

// Get rid of extra paragraph if created by end-of-list on last line
if (ppg->cParagraph && !(Paragraph + ppg->cParagraph)->iMemOffset &&
```

```
            !(Paragraph + ppg->cParagraph)->iIndent) {
    ppg->cParagraph--;
  } /* endif */ ppg->cParagraph++;  // make cParagraph non-zero-based.

// For callers that will scroll by paragraph, find out how many
  // page tops there are without leaving undue space at the bottom.
  {static int iFitAtEnd;
  for (iFitAtEnd = yPageHeight = 0;
       iFitAtEnd < ppg->cParagraph && yPageHeight <= yDstHeight;
       iFitAtEnd++) {
    yPageHeight += (Paragraph + ppg->cParagraph-1 - iFitAtEnd)->yHeight;
    if (!(Paragraph + ppg->cParagraph-1 - iFitAtEnd)->fCompAbove &&
        yPageHeight + cyChar <= yDstHeight) {
      yPageHeight += cyChar;
    } /* endif */
  } /* endfor */
  ppg->cPageTops = (ppg->cParagraph) - (iFitAtEnd - 1) + 1;
  }

GlobalUnlock (ppg->hPageText);
  GlobalUnlock (ppg->hParagraph);o// CER CHANGE: LocalUnlock to GlobalUnlock
  if (!(wFlags & IP_MEM)) {
    GlobalUnlock (hFileText);
    GlobalFree (hFileText);
  } /* endif */

DeleteObject (SelectObject (hdc, hFont));

return iPageNum + 1;

}  /* end of INITPAGE */

/*----------------------------------------------*
 * ShowPage:                                    *
 * Show a page, starting at a specified subpage *
 *----------------------------------------------*/ void FAR PASCAL ShowPage(STRUCTBMPAGE FAR *ppg, // structure set up by InitPage
            HDC  hdc,           // device context handle
            int  iSubPage)      // which page to show
{
  // ShowPage is a shell around ShowPar
  ShowPar (ppg, hdc, iSubPage, SP_SHOWPAGE);
}

// CER CHANGE: comments for ShowPar() used to be here.  I moved them to
//oimmediately before the ShowPar() function.

// CER CHANGE: I moved the #define DT_SHOWPAGE from here to bmsubset.h

// structure for positions of bitmaps on the screen
typedef struct tagABITMAPS {
  short  top;    // y position
  short  left;   // x position
  int    iSym;   // which symbol it is
} ABITMAPS;
typedef ABITMAPS *PABITMAPS;

// Subroutine to change symbols into spaces and record positions for bitmaps
void Space4Bitmaps (HDC      hdc,         // handle to device context
          char     *szTemp,     // text to display
          PRECT    prect,       // rectangle to display it in
          PINT     pcBitmaps,   // -> number of bitmaps so far
          PABITMAPS paBitmaps,  // -> array of bitmap data
          int      cyChar,      // height of a line
          int      lSpaceExtent,// width of a space
          BOOL     bCenterLoners) // true = center symbols if
                                  //   alone on line with no text
{
  static int iSym;
  static int i;
  static char *psz;
  static char szRestOfTemp[MAXPARLEN],
```

```
        sz1stOfTempRev[MAXPARLEN],
o       szSymbolSpace[MAXPARLEN];
        char *charptr;o// CER ADDITION: points to &hpx=xxx.
        static int iBegLine;
        static int iNumSpaces;
        static int cParBitmaps;

cParBitmaps = 0;
        for (i = 0; i < MAXPARLEN; i++) szSymbolSpace[i] = '-';

// Process each ampersand
        psz = szTemp;
        while (psz = strstr (psz, "&")) {

// See which symbol it is.
            for (iSym = 0; aSymbols[iSym].idb; iSym++)
o               if (lstrncmp (aSymbols[iSym].szSymbol, psz, strlen (aSymbols[iSym].szSymbol)) &&
o                   aSymbols[iSym].idb != 256) // CER ADDITION: ignore color and font symbols
                    break;
            if (aSymbols[iSym].idb && *pcBitmaps < MAXBITMAPS) {
                // Symbol was recognized and there's room for more in the array o  // Replace symbol with spaces
o  strcpy (szRestOfTemp, psz + strlen (aSymbols[iSym].szSymbol));
o
o  iNumSpaces = 2 + aSymbols[iSym].bmWidth / iSpaceExtent;
o
            for (i = 0; i < iNumSpaces; i++) {
                psz[i] = ' ';
                szSymbolSpace[i + (int) (psz - szTemp)] = ' ';
o  } o  strcpy (&psz[iNumSpaces], szRestOfTemp);

// Set location of bitmap on screen
            (paBitmaps + *pcBitmaps)->left = (short) prect->left;
            (paBitmaps + *pcBitmaps)->top  = (short) prect->top;
            (paBitmaps + *pcBitmaps)->iSym = iSym;

iBegLine = 0;
o  for (i=0; i < psz - szTemp; i++) {
                if (szTemp[i] == '\n') {
                    (paBitmaps + *pcBitmaps)->top += cyChar;
                    iBegLine = i+1;
                }
            }
o  (paBitmaps + *pcBitmaps)->left +=
                GetTextExtent (hdc, &szTemp[iBegLine],
ooo             psz - &szTemp[iBegLine])
                + ((iNumSpaces * iSpaceExtent) - aSymbols[iSym].bmWidth)
o   / 2;

o  // CER ADDITION: remove space that "&hpx=xxx." takes up in positioning
   //oo  bitmap.
            charptr = &szTemp[iBegLine];
o  while((charptr = strstr(charptr, "&hp")) && (charptr < psz))
o  {
o       (paBitmaps + *pcBitmaps)->left -= GetTextExtent(hdc, charptr, 9);
            charptr += 9;
        }
o  // end CER ADDITION (paBitmaps + *pcBitmaps)->top +=
                (cyChar / 2) - (aSymbols[iSym].bmHeight / 2);

o  if (bCenterLoners) {
            // If it is alone on a line, center it
o   strcpy (sz1stOfTempRev, szTemp);
                sz1stOfTempRev[psz - szTemp] = '\0';
                for (i = 0; sz1stOfTempRev[i]; i++) {
                    if (szSymbolSpace[i] == ' ') {
                        sz1stOfTempRev[i] = '-';
                    } /* endif */
                } /* endfor */
                strrev (sz1stOfTempRev);
                if (strchr (sz1stOfTempRev, '\n')) {
                    strcpy (strchr (sz1stOfTempRev, '\n'), "\0");
                } /* endif */
                if (strchr (szRestOfTemp, '\n')) {
                    strcpy (strchr (szRestOfTemp, '\n'), "\0");
                } /* endif */
```

```
        strcat (szRestOfTemp, sz1stOfTempRev);
        if (!szRestOfTemp[strspn (szRestOfTemp, " ")]) {
            (paBitmaps + *pcBitmaps)->left =
                prect->left +
                (prect->right - prect->left -
                    aSymbols[iSym].bmWidth) / 2 ;
        } /* endif */
    } /* endif */

(*pcBitmaps)++;
    cParBitmaps++;

} else
    // Not a recognized symbol, so just go to next character.
    psz++;
}

// If a space comes after a \f, DrawText drops it (1st space only).
// The only way I can have spaces after a \f is for a symbol.
// So for for symbol-induced spaces after \f's, add a space.
// Just skip this for paragraphs without bitmaps
for (i = 0; cParBitmaps && szTemp[i]; i++) {
    if (szTemp[i] == '\n' && szTemp[i+1] == ' ')
        strcpy (&szTemp[i+2], strcpy (szRestOfTemp, &szTemp[i+1]));
} /* endfor */

} /* end Space4Bitmaps */  // CER CHANGE: this used to say end SHOWPAR.
ooooI/o I have no idea why, so I changed it.o void DrawTheBitmaps (STRUCTBMPAGE FAR *ppg,   // Struct from InitPage
            HDC     hdc,        // handle to device context
            PINT    pcBitmaps,  // -> number of bitmaps so far
            PABITMAPS paBitmaps)  // -> array of bitmap data
{
    static int iBmp;
    static char szTemp[80];
    static HBITMAP hbm;
    static BITMAP bm;

for (iBmp=0; iBmp < *pcBitmaps; iBmp++) { if (aSymbols[(paBitmaps + iBmp)->iSym].idb == IDB_ICON) { strcpy (szTemp, szWelcomePath);
            strcat (szTemp, &aSymbols[(paBitmaps + iBmp)->iSym].szSymbol[1]);
            strcat (szTemp, "ico");

ShowIcoFile (hLibInst,(LPSTR) szTemp, hdc, (paBitmaps + iBmp)->left,
                        (paBitmaps + iBmp)->top);

} else { if (aSymbols[(paBitmaps + iBmp)->iSym].idb == IDTBL) {
                strcpy (szTemp, szWelcomePath);
                strcat (szTemp, &aSymbols[(paBitmaps + iBmp)->iSym].szSymbol[1]);
                strcat (szTemp, "bmp");
                hbm = InitDIB (NULL, szTemp);
                GetObject (hbm, sizeof (BITMAP), (LPSTR) &bm);
                // bm is not used since I already know the bitmaps dimensions
            } else if (aSymbols[(paBitmaps + iBmp)->iSym].idb > MAXINTERNALBITMAP) {
                hbm = LoadBitmap (NULL,
                    (LPSTR)(DWORD) aSymbols[(paBitmaps + iBmp)->iSym].idb);
            } else {
                hbm = LoadBitmap (hLibInst,
                    MAKEINTRESOURCE (aSymbols[(paBitmaps + iBmp)->iSym].idb));
            } /* endif */ if (GetDeviceCaps (hdc, TECHNOLOGY) == DT_RASDISPLAY) {
                DrawBitmap (hdc, hbm, (paBitmaps + iBmp)->left,
                        (paBitmaps + iBmp)->top);
            } else {
                PrintBitmap (hdc, hbm, (paBitmaps + iBmp)->left,
                        (paBitmaps + iBmp)->top,
                        aSymbols[(paBitmaps + iBmp)->iSym].bmWidth,
                        aSymbols[(paBitmaps + iBmp)->iSym].bmHeight,
                        aSymbols[(paBitmaps + iBmp)->iSym].bmBitsPixel,
                        aSymbols[(paBitmaps + iBmp)->iSym].bmPlanes );
            }
            DeleteObject (hbm);

} /* endif */
    }
```

```
}    /* end DRAWTHEBITMAPS */

// Subroutine to upper-case a character in the Ansi code page
char FAR PASCAL UpChar (char c)
{
    static char szChar[2];
    szChar[0] = c;
    szChar[1] = '\0';
    AnsiUpper (szChar);
    return szChar[0];
}

// Compare two letters in country specific sort order
int CompLangChar (char a, char b)

{
    static char  one[2], two[2];

one[1] = two[1] = '\0';
    one[0] = a;
    two[0] = b;
    return (lstrcmp (one,two));
}

/*--------------------------------------------*
 * ShowPar: Shows a Paragraph                 *
 * Places the requested paragraph first on the screen, unless one of the *
 * following flags is used:                   *
 *   SP_PAGEUP - pages up from the given paragraph *
 *   SP_PAGEDOWN - pages down from the given paragraph *
 *   SP_PARDOWN - go down as many paragraphs as necessary to get the next *
 *     paragraph on the screen.               *
 *   SP_LETTER - Finds the 1st paragraph beginning with the specified *
 *     letter.  The letter is in the high byte of the flags word, and *
 *     is converted to upper case.            *
 *     Search starts at the specified paragraph. *
 *   SP_SHOWPAGE - performs the ShowPage function.  ShowPage is a shell *
 *     around ShowPar.  Do not use with any other flags!  The 2nd parm *
 *     is interpreted as a page number rather than a pragraph number. *
 *                                            *
 * Returns the number of the first paragraph on the screen. *
 *   This is the same as the input parameter unless flags are used. *
 *   If SP_LETTER is used, returns -1 if letter is not found; *
 *     in this case, the screen is not modified. *
 *--------------------------------------------*/
int FAR PASCAL ShowPar (STRUCTBMPAGE FAR *ppg, // Struct from InitPage
            HDC hdc,       // Device Context handle
            int iTopPar,   // 1st paragraph to show
            WORD wFlags)   // 0 or combo of flags listed above
{
    static LPSTR lpPageText;
    static struct structPar *Paragraph;
    static int iParagraph;
    static RECT rect;
    static int cxChar, cyChar, cyCharHdr;
    static TEXTMETRIC tm;
    static HBRUSH hBrush;
    static HFONT hFont, hFont2;
    static int yHeight;
    static char szTemp[MAXPARLEN];
    static int cBitmaps;
    static int iSpaceExtent;
    static int iSubPage;
    static ABITMAPS aBitmaps[MAXBITMAPS];
    static char cFind;
    static RECT rTemp;

iParagraph = 0; // abend return value

// If an error occurred in InitPage, just redisplay it.
    if (ppg->szIPError[0]) {
        DrawText (hdc, ppg->szIPError, -1, &ppg->rectDst,
            DT_WORDBREAK | DT_CENTER | DT_VCENTER | DT_NOPREFIX);

} else if (ppg->hPageText) {

// Initialize stuff cBitmaps = 0;
```

```
        CopyRect (&rect, &ppg->rectDst);

ooIpPageText = GlobalLock (ppg->hPageText);
ooParagraph  = (void *) GlobalLock (ppg->hParagraph);o// CER CHANGE: LocalLock to GlobalLock // Default font stuff
    hFont = SelectObject (hdc, CreateFontIndirect (&ppg->lf));
    GetTextMetrics (hdc, &tm);
    cxChar = tm.tmAveCharWidth;
    cyChar = tm.tmHeight + tm.tmExternalLeading;

iSpaceExtent = (int) LOWORD (GetTextExtent (hdc, " ", 1));

// Height of Header font if different
    if (ppg->lfh.lfHeight) {
        // Select special font for headers
        hFont2 = SelectObject (hdc, CreateFontIndirect (&ppg->lfh));
        GetTextMetrics (hdc, &tm);
        cyCharHdr = tm.tmHeight + tm.tmExternalLeading;
        DeleteObject (SelectObject (hdc, hFont2));
        GetTextMetrics (hdc, &tm);
    } else {
        cyCharHdr = cyChar;
    }

// Process special flags
    yHeight = 0;
    if (wFlags & SP_PAGEDOWN) {
        for (iParagraph = iTopPar; iParagraph < ppg->cParagraph; iParagraph++) {
            yHeight += (Paragraph + iParagraph)->yHeight;
            if (yHeight > rect.bottom - rect.top + 1) {
                break;
            } /* endif */
            if (iParagraph < ppg->cParagraph - 1 &&
                !(Paragraph + iParagraph + 1)->fCompAbove) {
                yHeight += (Paragraph + iParagraph + 1)->fHeader ?
                    cyCharHdr : cyChar;
            } /* endif */
        } /* endfor */
        iTopPar = min (iParagraph, ppg->cParagraph - 1);

} else if (wFlags & SP_PAGEUP && iTopPar > 0) {
        for (iParagraph = iTopPar-1; iParagraph >= 0; iParagraph--) {
            yHeight += (Paragraph + iParagraph)->yHeight;
            if (yHeight > rect.bottom - rect.top + 1) {
                break;
            } /* endif */
            if (iParagraph > 0 &&
                !(Paragraph + iParagraph)->fCompAbove) {
                yHeight += (Paragraph + iParagraph)->fHeader ?
                    cyCharHdr : cyChar;
            } /* endif */
        } /* endfor */
        iTopPar = iParagraph+1;

} else if (wFlags & SP_PARDOWN) {
        if (iTopPar >= ppg->cPageTops - 1) {
            if (iTopPar < ppg->cParagraph) {
                iTopPar++;
            } /* endif */
        } else {
            // Figure out what the next paragraph is to be shown, like page down
            for (iParagraph = iTopPar; iParagraph < ppg->cParagraph; iParagraph++) {
                yHeight += (Paragraph + iParagraph)->yHeight;
                if (yHeight > rect.bottom - rect.top + 1) {
                    break;
                } /* endif */
                if (iParagraph < ppg->cParagraph - 1 &&
                    !(Paragraph + iParagraph + 1)->fCompAbove) {
                    yHeight += (Paragraph + iParagraph + 1)->fHeader ?
                        cyCharHdr : cyChar;
                } /* endif */
            } /* endfor */
            iParagraph = min (iParagraph, ppg->cParagraph - 1);
            // Now work my way back up the page, like page up
            for (yHeight = 0;
                iParagraph >= 0; iParagraph--) {
                yHeight += (Paragraph + iParagraph)->yHeight;
                if (yHeight > rect.bottom - rect.top + 1) {
                    break;
                } /* endif */
                if (iParagraph > 0 &&
```

```
        if(Paragraph + iParagraph)->fCompAbove) {
            yHeight += (Paragraph + iParagraph)->fHeader ?
                cyCharHdr : cyChar;
        } /* endif */
    } /* endfor */
    iTopPar = iParagraph+1;
} /* endif */

} else if (wFlags & SP_LETTER) { cFind = UpChar ((char) (wFlags >> 8));

do { for (iParagraph = iTopPar+1; iParagraph < ppg->cParagraph; iParagraph++) { if (CompLangChar(UpChar (lpPageText[(Paragraph + iParagraph)->iMemOffset]),
                    cFind) >=0   )
                break;

} /* endfor */
        if (iParagraph == ppg->cParagraph) {
            // If I hit the end, go back one.
            iParagraph--;

if (CompLangChar (cFind,
                    UpChar (lpPageText[(Paragraph + iParagraph)->iMemOffset])) ==0 ) {
                // If I'm re-finding the last character, start again
                // at the beginning
                iParagraph = 0;
            } /* endif */
        } /* endif */ if (CompLangChar( UpChar (lpPageText[(Paragraph + iParagraph)->iMemOffset]),
                cFind) ==0) {
            // I found a par beginning with the char, so I'll keep it
            iTopPar = iParagraph;
        } else {
            if (iTopPar == -1) {
                // I tried a 2nd time, starting from the top,
                // but still couldn't find a match. This is the best
                // I can do: the 1st char after what was asked for.
                iTopPar = iParagraph;
            } else {
                // I passed the character that was asked for,
                // so try again from the top
                iTopPar = -1;
            } /* endif */
        } /* endif */

} while (iTopPar == -1); /* enddo */

} else if (wFlags & SP_SHOWPAGE) { iSubPage = iTopPar;
    for (iParagraph = 0;
            (Paragraph + iParagraph)->iPage != iSubPage;
            iParagraph++) ;
    iTopPar = iParagraph;

} /* endif */

// Work with entire rectangle, not just text rectangle
rect.left   -= LEFTMARG;
rect.top    -= (TOPMARG+2) ;
rect.right  += RIGHTMARG;
rect.bottom += BOTTOMMARG;

// Blank the rectangle white
hBrush = GetStockObject (WHITE_BRUSH);
FillRect (hdc, &rect, hBrush);
// draw rectangle if requested.
if (ppg->wIPFlags & IP_RECT) {
    Rectangle(hdc, rect.left, rect.top, rect.right, rect.bottom);
}

// Now go back to working with text rectangle
CopyRect (&rect, &ppg->rectDel);
// However, allow lots of room on right to avoid DrawText wrapping
rect.right += cxChar;
```

```
// Start with iTopPar displaying paragraphs
for (iParagraph = iTopPar;

(iParagraph < ppg->cParagraph) &&
    ( (wFlags & SP_SHOWPAGE) ?
       (iSubPage == (Paragraph + iParagraph)->iPage) :
       ((Paragraph + iParagraph)->yHeight +
         (((Paragraph + iParagraph)->fCompAbove || iParagraph == iTopPar)
            ? 0 : ((Paragraph + iParagraph)->fHeader ? cyCharHdr : cyChar))
         <= rect.bottom - rect.top + 1)
    );

iParagraph ++) {

// Select header font if it's a header & header font is given
o   if ((Paragraph + iParagraph)->fHeader && ppg->lfh.lfHeight) {
o       // Select special font for headers
o       hFont2 = SelectObject (hdc, CreateFontIndirect (&ppg->lfh));
o       GetTextMetrics (hdc, &tm);
            cxChar = tm.tmAveCharWidth;
            cyChar = tm.tmHeight + tm.tmExternalLeading;
o       iSpaceExtent = (int) LOWORD (GetTextExtent (hdc, " ", 1));
        } /* endif */

// Put blank line above it if needed
    if ((Paragraph + iParagraph)->fCompAbove &&
        rect.top > ppg->rectDst.top) {
        rect.top += cyChar;
    } /* endif */

// Set up the ParShown structure
    ppg->ParShown[iParagraph - iTopPar].yTop = rect.top;
    ppg->ParShown[iParagraph - iTopPar].yBottom = rect.top +
        (Paragraph + iParagraph)->yHeight;
    lstrcpy ( ppg->ParShown[iParagraph - iTopPar].szFile,
        (Paragraph + iParagraph)->szFile );

// Indent and show indention string
    if ((Paragraph + iParagraph)->iIndent) {
        lstrcpy (szTemp, (Paragraph + iParagraph)->szIndent);
        CopyRect (&rTemp, &rect);
        rTemp.right = rTemp.left +
            (Paragraph + iParagraph)->iIndent * cxChar ;
        Space4Bitmaps (hdc, szTemp, &rTemp, &cBitmaps, aBitmaps, cyChar,
            iSpaceExtent, TRUE);
o   // Draw the paragraph text o   // CER CHANGE: call my DispText() function instead of DrawText()
o   DispText(szTemp, hdc, rTemp, cyChar);
        //DrawText (hdc, szTemp, -1, &rTemp, DT_SHOWPAGE);

rect.left += (Paragraph + iParagraph)->iIndent * cxChar;
    } /* endif */

// Replace any &symbol. names with space for bitmaps & show paragraph
    lstrcpy (szTemp, lpPageText + (Paragraph + iParagraph)->iMemOffset);
    Space4Bitmaps (hdc, szTemp, &rect, &cBitmaps, aBitmaps, cyChar,
ooo iSpaceExtent, TRUE);

o // CER CHANGE: call my DispText() function instead of DrawText()
o DispText(szTemp, hdc, rect, cyChar);

// Move down to position for next paragraph
    rect.top += (Paragraph + iParagraph)->yHeight;

// Recover from indenting
    rect.left = ppg->rectDst.left;

// Reset font after a header
o   if ((Paragraph + iParagraph)->fHeader && ppg->lfh.lfHeight)
o   {
o       DeleteObject (SelectObject (hdc, hFont2));
o       hFont2 = NULL;o// CER ADDITION: lets me know special
        ooo//   header font isn't being used
        GetTextMetrics (hdc, &tm);
            cxChar = tm.tmAveCharWidth;
            cyChar = tm.tmHeight + tm.tmExternalLeading;
o       iSpaceExtent = (int) LOWORD (GetTextExtent (hdc, " ", 1));
        } /* endif */
```

```
    } /* endfor */

// Calculate the total number of paragraphs shown
    ppg->cParShown = iParagraph - iTopPar;

GlobalUnlock (ppg->hPageText);
    GlobalUnlock (ppg->hParagraph);  oo// CER CHANGE: LocalUnlock to GlobalUnlock
    DeleteObject (SelectObject (hdc, hFont));

// Now draw the bitmaps
    DrawTheBitmaps (ppg, hdc, &cBitmaps, aBitmaps);

// if rectangle requested, draw it again in case it was overwritten
    if (ppg->wIPFlags & IP_RECT) {
        // Work with entire rectangle, not just text rectangle
        CopyRect (&rect, &ppg->rectDst);
        rect.left   -= LEFTMARG;
        rect.top    -= (TOPMARG+2);
        rect.right  += RIGHTMARG;
        rect.bottom += BOTTOMMARG;
        SelectObject (hdc, GetStockObject (NULL_BRUSH));
        Rectangle(hdc, rect.left, rect.top, rect.right, rect.bottom);
    }

SelectObject (hdc, hBrush);

}
    return iTopPar;

} /* end SHOWPAR */

/*----------------------------------------*
 * KillPage - frees memory used by InitPage.   *
 * Must be performed between InitPages.        *
 *--------------------------------------*/ void FAR PASCAL KillPage(STRUCTBMPAGE FAR *ppg)
{
    if (ppg->hPageText) {
        GlobalFree (ppg->hPageText);
        GlobalFree (ppg->hParagraph);// CER CHANGE: LocalFree to GlobalFree
        ppg->hPageText = 0;
    } /* endif */
}

/*----------------------------------------*
 * SortTerm: sorts the paragraphs in the InitPage indicated by    *
 * the STRUCTBMPAGE parameter. Sorted by definition term.         *
 *--------------------------------------*/

// Compare the indent strings in two paragraph elements
// CER CHANGE: I changed the argument types from char * to const void far *
//and typecast the arguments to lstrcmp. This was required in
//oorder to compile using Borland C v3.1.
int CompTerm (const void far *arg1, const void far *arg2)
{
    return (lstrcmp ((char *)arg1, (char *)arg2);
}

// Function to sort a page; assuming entire page is a :dl.
void FAR PASCAL SortTerm (STRUCTBMPAGE FAR *ppg)
{
    static struct structPar *Paragraph;

if (ppg->hPageText) {
        Paragraph = (void *) GlobalLock (ppg->hParagraph);o// CER CHANGE: LocalLock to GlobalLock
        // Make 1st paragraph have same compact setting as others in list.
        (Paragraph)->fCompAbove = (Paragraph + 1)-> fCompAbove;

qsort (Paragraph,              // Structure to sort
            ppg->cParagraph,           // number of elements
            sizeof *Paragraph,         // size of element
            CompTerm                   // compare function
    o   );

GlobalUnlock (ppg->hParagraph);oo// CER CHANGE: LocalUnlock to GlobalUnlock
    } /* endif */

}
```

```
/*----------------------------------------*
 * SortDef: sorts the paragraphs in the InitPage indicated by
 * the STRUCTBMPAGE parameter. Sorted by paragraph text, which
 * is also the definition description (:dd.)
 *----------------------------------------*/

LPSTR lpPageTextSort;

// Compare the indent strings in two paragraph elements
// CER CHANGE: I changed the argument types from struct structPar *
//oto const void far * and typecast the arguments to lstrcmp.
//oThis was required in order to compile using Borland C v3.1.
int CompDef (const void far *arg1, const void far *arg2)
{
  return (lstrcmp (&lpPageTextSort[((struct structPar *)arg1)->iMemOffset],
oo         &lpPageTextSort[((struct structPar *)arg2)->iMemOffset]));
}

// Function to sort a page; assuming entire page is a :dl.
void FAR PASCAL SortDef (STRUCTBMPAGE FAR *ppg)
{
  static struct structPar *Paragraph;

if (ppg->hPageText) {
    lpPageTextSort = GlobalLock (ppg->hPageText);
    Paragraph = (void *) GlobalLock (ppg->hParagraph);o// CER CHANGE: LocalLock to GlobalLock
    // Make 1st paragraph have same compact setting as others in list.
    (Paragraph)->fCompAbove = (Paragraph + 1)-> fCompAbove;

qsort (Paragraph,         // Structure to sort
           ppg->cParagraph,   // number of elements
           sizeof *Paragraph, // size of element
           CompDef            // compare function
          );

GlobalUnlock (ppg->hParagraph);o// CER CHANGE: LocalUnlock to GlobalUnlock
    GlobalUnlock (ppg->hPageText);
  } /* endif */

}

LPSTR FAR PASCAL GetParID (STRUCTBMPAGE FAR *ppg, int iParagraph, LPSTR lpid)
{
  static LPSTR lpPageText;
  static struct structPar *Paragraph;

if (ppg->hPageText) {
    lpPageText = GlobalLock (ppg->hPageText);
    Paragraph = (void *) GlobalLock (ppg->hParagraph);o// CER CHANGE: LocalLock to GlobalLock lstrcpy ( lpid, (Paragraph + iParagraph)->szFile );

ooGlobalUnlock (ppg->hParagraph);oo// CER CHANGE: LocalUnlock to GlobalUnlock
    GlobalUnlock (ppg->hPageText);

} else {
    lpid[0] = '\0';
  } /* endif */ return lpid;

}

/*----------------------------------------*
 * DrawLine is similar to DrawText, but it does symbol substitution
 * for the bmsubset bitmaps. Returns the pel width of the line.
 * The flag DL_CALCLINE causes the line length to be returned without
 * drawing anything.
 *----------------------------------------*/ int FAR PASCAL DrawLine (STRUCTBMPAGE FAR *ppg, // Init page structure
        HDC hdc,           // handle to dc
        LPSTR szLine,      // line to display
        LPPOINT pptLine,   // point of line in dc
        WORD wFlags)       // flags
{
  static int cyChar;
  static TEXTMETRIC tm;
  static int cBitmaps;
  static int iSpaceExtent;
  static ABITMAPS aBitmaps[MAXBITMAPS];
```

```
static char szTemp[80];
static RECT rect;
static HFONT hFont;

// Initialize things lstrcpy (szTemp, szLine);

cBitmaps = 0;

hFont = SelectObject (hdc, CreateFontIndirect (&ppg->lf));
GetTextMetrics (hdc, &tm);
cyChar = tm.tmHeight + tm.tmExternalLeading;

rect.left   = pptLine->x;
rect.top    = pptLine->y;
rect.right  = GetSystemMetrics (SM_CXSCREEN);
rect.bottom = rect.top + cyChar;

iSpaceExtent = (int) LOWORD (GetTextExtent (hdc, " ", 1));

Space4Bitmaps (hdc, szTemp, &rect, &cBitmaps, aBitmaps, cyChar,
        iSpaceExtent, FALSE);

if (!(wFlags & DL_CALCLINE)) {
    // Draw the paragraph text
    DrawText (hdc, szTemp, -1, &rect, DT_SHOWPAGE);
    // Now draw the bitmaps
    DrawTheBitmaps (ppg, hdc, &cBitmaps, aBitmaps);
} /* endif */

DeleteObject (SelectObject (hdc, hFont));

return (int) LOWORD (GetTextExtent (hdc, szTemp, strlen (szTemp)));

} /* end DRAWLINE */

/*---------------------------------------------------------------*
* InitStr:
* Reads the file GLOBALcc.SCR containing all strings for BMSUBSET and
*   strings used globally by other programs.
* The GLOBALcc.SCR file contains info on the format of the file.
*   (It is a BookMaster list, with id=idnum on each item.)
* InitStr also loads up all the icon and bitmap symbols.
* Use AddStr to load additional .SCR files. (InitStr loads AddStr,
*   after first determining the current language.)
* Input: pointer to a string that will hold the language code (e.g. US).
*   The string must be at least 3 chars long. If the pointer is NULL,
*   the string is not copied.
* Output: TRUE if successful, FALSE otherwise
* Other input: Environmental variables can override the defaults:
*   BMSUBSET=c:\welcome by default
*   CNTYCODE=cc by default, where cc is the last 2 letters in GLOBALcc.SCR*
*---------------------------------------------------------------*/

// Global variables for string tables

GLOBALHANDLE hStrLst = 0; // Handle to strings in memory
int lStrOffset[MAXSTRNUM] // offset of each string in global memory
    = {0};
WORD wStrID[MAXSTRNUM];  // id number of each string
int iStr = -1;          // Number of last string read BOOL FAR PASCAL InitStr (LPSTR szCC)
{
    static int iTag;
    static char szLine[MAXLINELEN];
    static char szStrFile[100];
    static int hFile;
    static LPSTR lpFileText;
    static struct find_t fileinfo;    // Results of file search
    static BITMAP bm;
    static HBITMAP hbm;
    static char szTemp[13];
    static GLOBALHANDLE hFileText;
    static long lFileLength;
    static int iSym;
    static LPSTR lpEnv;

// Just set the language and return if already done.
    if (szLanguage[0]) {
```

```
     if (szCC) lstrcpy (szCC, szLanguage);
     return TRUE;
   } /* endif */

// Check the environmental variables for language & path overrides
   lpEnv = GetDOSEnvironment();
   for (iSym=0; lpEnv[iSym] || lpEnv[iSym+1]; iSym++) {
     // Can't use memcmp because the environment is in a far segment
     if (lpEnv[iSym+0] == 'B' &&
         lpEnv[iSym+1] == 'M' &&
         lpEnv[iSym+2] == 'S' &&
         lpEnv[iSym+3] == 'U' &&
         lpEnv[iSym+4] == 'B' &&
         lpEnv[iSym+5] == 'S' &&
         lpEnv[iSym+6] == 'E' &&
         lpEnv[iSym+7] == 'T' &&
         lpEnv[iSym+8] == '=' ) lstrcpy (szWelcomePath, &lpEnv[iSym+9]);
     if (lpEnv[iSym+0] == 'C' &&
         lpEnv[iSym+1] == 'N' &&
         lpEnv[iSym+2] == 'T' &&
         lpEnv[iSym+3] == 'Y' &&
         lpEnv[iSym+4] == 'C' &&
         lpEnv[iSym+5] == 'O' &&
         lpEnv[iSym+6] == 'D' &&
         lpEnv[iSym+7] == 'E' &&
         lpEnv[iSym+8] == '=' ) {
       szLanguage[0] = lpEnv[iSym+9];
       szLanguage[1] = lpEnv[iSym+10];
       szLanguage[2] = '\0';
     }
   } /* endfor */
   if (szWelcomePath[ strlen(szWelcomePath) - 1] != '\\' ) {
     strcat (szWelcomePath, "\\");
   } /* endif */

// Get the language that AddStr will use.
   if (!szLanguage[0]) {
     strcpy (szStrFile, szWelcomePath);
     strcat (szStrFile, "GLOBAL??.SCR");
     _dos_findfirst (szStrFile, _A_NORMAL, &fileinfo);
     szLanguage[0] = fileinfo.name[6];
     szLanguage[1] = fileinfo.name[7];
     szLanguage[2] = '\0';
   } /* endif */
   // If input parm is not NULL, copy the country code to the caller's string
   if (szCC) lstrcpy (szCC, szLanguage);

// Set up file name for AddStr, up to the language.
   strcpy (szStrFile, szWelcomePath);
   strcat (szStrFile, "GLOBAL");

// Read the file & put it in the string table
   if (!AddStr (szStrFile)) return FALSE;

// Set the dimensions of each bit map that can be included in text
   for (iSym = 0; aSymbols[iSym].idb; iSym++) {

// Do not process special characters
     if (aSymbols[iSym].idb > 256) { // CER CHANGE: 256 use to be 0xFF if (aSymbols[iSym].idb > MAXINTERNALBITMAP) {
         hbm = LoadBitmap (NULL, (LPSTR)(DWORD)aSymbols[iSym].idb);
       } else {
         hbm = LoadBitmap (hLibInst, MAKEINTRESOURCE (aSymbols[iSym].idb));
       } /* endif */
       GetObject (hbm, sizeof (BITMAP), (LPSTR) &bm);
       DeleteObject (hbm);
       aSymbols[iSym].bmWidth    = bm.bmWidth;
       aSymbols[iSym].bmHeight   = bm.bmHeight;
       aSymbols[iSym].bmBitsPixel = bm.bmBitsPixel;
       aSymbols[iSym].bmPlanes   = bm.bmPlanes;

} /* endif */

}

// Add list of icons to Symbol structure.

strcpy (szStrFile, szWelcomePath);
   strcat (szStrFile, "*.ICO");
   if (!(_dos_findfirst(szStrFile, _A_NORMAL, &fileinfo)) ) {
     do {
```

```c
        strcpy (szTemp, fileinfo.name);
        szTemp [strcspn (szTemp, ".")  + 1] = '\0';    // Get name + period
        aSymbols[iSym].szSymbol[0] = '&';              // put & in front
        strcpy (&aSymbols[iSym].szSymbol[1], szTemp);  // now has format &v.
        AnsiLower ((LPSTR) aSymbols[iSym].szSymbol);
        aSymbols[iSym].idb = IDB_ICON;
        aSymbols[iSym].bmWidth = GetSystemMetrics (SM_CXICON);
        aSymbols[iSym].bmHeight = GetSystemMetrics (SM_CYICON);
        iSym++;

if (iSym == MAXNUMSYMBOLS-1) return FALSE;

} while (_dos_findnext(&fileinfo) == NULL ); /* enddo */
}

// Add list of bitmaps that are listed in BITMAPS.TBL

// Start reading the file
strcpy (szStrFile, szWelcomePath);
strcat (szStrFile, "BITMAPS.TBL");
if ((hFile = _lopen(szStrFile, OF_READ)) == -1) {
    return TRUE;    // file doesn't exist
} /* endif */

// Get enough memory to store temporary copy of file.
// Memory allocated is held by calling program
hFileText = GlobalAlloc (GHND, lFileLength = filelength (hFile) + 1);
if (!hFileText) {
    _lclose (hFile);
    return FALSE;
} /* endif */
lpFileText = GlobalLock (hFileText);
_lread (hFile, lpFileText, LOWORD(lFileLength));
_lclose (hFile);

do {
    // Get the next line
    iTag = GetLine ((LPDWORD) &lpFileText, szLine);

if (strlen(szLine) > 20) {
        // Parse the line.
        strcpy (aSymbols[iSym].szSymbol, strtok(szLine, " "));
        aSymbols[iSym].idb = IDTBL;
        aSymbols[iSym].bmWidth     =      atoi (strtok (NULL, " "));
        aSymbols[iSym].bmHeight    =      atoi (strtok (NULL, " "));
        aSymbols[iSym].bmBitsPixel = (BYTE) atoi (strtok (NULL, " "));
        aSymbols[iSym].bmPlanes    = 1;

iSym++;
        if (iSym == MAXNUMSYMBOLS-1) {
            GlobalUnlock (hFileText);
            GlobalFree (hFileText);
            return FALSE;
        }
    } /* endif */

} while (iTag != TAG_EOF); /* enddo */

GlobalUnlock (hFileText);
GlobalFree (hFileText);

return TRUE;

} /* end INITSTR */

/*---------------------------------------------------------------*
 * AddStr:                                                       *
 * Appends to the string table a new .SCR file, which must have the same *
 *   format as GLOBALcc.SCR.                                     *
 * Only the 1st 6 letters of the filename are passed to this routine; *
 *   "cc.SCR" is appended.                                       *
 * The file is located in the current directory unless overridden by *
 *   a path in the file name.                                    *
 * You must use InitStr before using AddStr.                     *
 *---------------------------------------------------------------*/
BOOL FAR PASCAL AddStr (LPSTR pszStrFile)
{
    static int iTag;
    static char szJUNK[MAXLINELEN+5];
    static char *szLine;
    static int hFile;
```

```
static LPSTR szStrLst, lpFileText;
static GLOBALHANDLE hFileText;
static long lFileLength;
static char szStrFile[100];
static BOOL bThrowAway;
static BOOL bFoundLine;

lstrcpy (szStrFile, pszStrFile);
strcat (szStrFile, szLanguage);
strcat (szStrFile, ".SCR");

szLine = szJUNK+5;
// Start reading the file
if ((hFile = _lopen(szStrFile, OF_READ)) == -1) {
    return FALSE;
} /* endif */

// Get enough memory to store temporary copy of file.
// Memory allocated is held by calling program
hFileText = GlobalAlloc (GHND, lFileLength = filelength (hFile) + 10);
if (!hFileText) {
    _lclose (hFile);
    return FALSE;
} /* endif */
lpFileText = GlobalLock (hFileText);
_lread (hFile, lpFileText, LOWORD(lFileLength));
_lclose (hFile);

bThrowAway = FALSE;
bFoundLine = FALSE;       // haven't started a line yet
do {
    // Get the next line
    iTag = GetLine ((LPDWORD) &lpFileText, szLine);

// Stop doing this if you've gotten to the end of file if ((iTag == TAG_ESL) || (iTag == TAG_EUL)) {
        break;
    } if (iTag == TAG_LI) {
        static int id;
        static int i;
        id= atoi(szID);
        for (i=0; (i < iStr) && ((WORD) id != wStrID[i]); i++);

bFoundLine = TRUE;
        bThrowAway = ((WORD) id == wStrID[i]);
    } /* end if line is duplicate */
//start skipping
    if ( !bThrowAway && bFoundLine) {

// Don't Ansi-fy the line if it is the note tag text
        if (atoi (szID) == IDS_NOTE) strcpy (szLine, szOriginalLine);

// Chop off trailing space if ((strlen(szLine)>0) && (szLine[ strlen(szLine)-1] == ' ')) {
            szLine[ strlen(szLine)-1] = '\0';
        } /* endif */

// Eliminate quotes at beginning/end of string
        if (szLine[0] == '"' && szLine[strlen (szLine) - 1] == '"') {
            strcpy (szLine, &szLine[1]);
            szLine[strlen (szLine) - 1] = '\0';
        } /* endif */

// Get more memory to contain the new string
        // This is the memory that the library will hold all strings
        // for all programs in
        // Since the memory must persistent the whole time
        // the library is active, the memory is declared as
        // SHARED. This causes it to be owned by the library
        // rather than the calling program if (!hStrLst) {
            hStrLst = GlobalAlloc (GHND | GMEM_SHARE, strlen (szLine) + 1);
            if (!hStrLst) {
```

```
      _lclose (hFile);
      return FALSE;
    } /* endif */
  } else {
    if (!GlobalReAlloc (hStrLst,
             GlobalSize (hStrLst) + strlen (szLine) + 1,
             GHND) ) {
      GlobalFree (hStrLst);
      _lclose (hFile);
      return FALSE;
    } /* endif */
  } /* endif */ szStrLst = GlobalLock (hStrLst);

if (iTag == TAG_LI) {

// Point to the location of the next string
    iStr++;

// Put the new string in memory
    lstrcpy ((szStrLst + iStrOffset[iStr]), szLine);

// Record the id of the string
    if (!(wStrID[iStr] = (WORD) atoi (szID))) {
      wStrID[iStr] = -1;
    } /* endif */

// Point to the position of the next string
    iStrOffset[iStr+1] = iStrOffset[iStr] + strlen (szLine) + 1;

} else {

// Put the new string in memory at end of current string
    lstrcat ((szStrLst + iStrOffset[iStr]), " ");
    lstrcat ((szStrLst + iStrOffset[iStr]), szLine);

// Give the string enough room to include the new part
    iStrOffset[iStr+1] += strlen (szLine) + 1;

} /* endif */

GlobalUnlock (hStrLst);

}    // stop throwing things away

} while (iTag != TAG_EOF && iStr < MAXSTRNUM-1); /* enddo */

GlobalUnlock (hFileText);
  GlobalFree (hFileText);

return TRUE;

}  /* end ADDSTR */

/*-----------------------------------------------------*
 * CopyStr: copy a string of the specified id.         *
 * Returns TRUE if string was found                    *
 *-----------------------------------------------------*/

BOOL FAR PASCAL CopyStr (WORD wID,        // id of string to get
              LPSTR lpszCopy)  // destination string
{
  static LPSTR szStrLst;
  static int iStr;

if (!szLanguage[0]) {
    lstrcpy (lpszCopy, "");
    return FALSE;
  } /* endif */ for (iStr = 0; wStrID[iStr] != wID && wStrID[iStr] != 0 ; iStr++) ;
  if (wStrID[iStr]) {
    szStrLst = GlobalLock (hStrLst);
    lstrcpy (lpszCopy, (szStrLst + iStrOffset[iStr]));
    GlobalUnlock (hStrLst);
  } else {
    lstrcpy (lpszCopy, "???");
    return FALSE;
```

```
} /* endif */
  return TRUE;
}

/*--------------------------------------------------*
 * Exit Procedure                                   *
 *--------------------------------------------------*/
// CER CHANGE: I changed the return value type from a VOID to an int.
//oThis was required in order to compile using Borland C v3.1
int FAR PASCAL WEP (int nParameter)
{
  GlobalFree(hStrLst);
  return;
}
```

JMSUBSET.H

```
// Constants

// Constants for Paging support:
#define MAXNUMPAGES 15   /* max number of pages */
#define MAXLINELEN 251   /* max line length + 1 */
#define MAXPARLEN 2048   /* max paragraph length + 1 */
#define MAXSTRLEN  512   /* max string length for GetStr */
#define MAXDTLEN 51      /* max definition term length */
#define MAXIDLEN 128     /* max "id=" length CER CHANGE: use to be 9 */
#define MAXPARIDLEN 9    /* CER ADDITION: used for szFile in structPar */
#define MAXPARSHOWN 20   /* max number of paragraphs shown at once */
#define MAXBITMAPS 30    /* max number of bitmaps in a page of text */
#define ULINDENT 2       /* # chars to indent unordered list items */
#define OLINDENT 4       /* # chars to indent ordered list items */
#define SLINDENT 2       /* # chars to indent simple list items */
#define DLINDENT 15      /* # chars to indent definition list items */
// Margins inside of rectangle
#define LEFTMARG (cxChar)
#define RIGHTMARG (cxChar)
//#define TOPMARG (cyChar / 2)
#define TOPMARG (cyChar / 2)

#define BOTTOMMARG (cyChar / 2)
#define MINHEIGHT (cyChar * 3)
#define MINWIDTH (cxChar * 3)
// InitPage input flags:
#define IP_SKIPH3 1  /* if 1st line is :h3, skip it */
#define IP_RECT  2   /* enclose page in line rectangle */
#define IP_MEM   4   /* file is in memory; ptr is to file itself, not name */
#define IP_CONT  8   /* continuous page, do not omit space between paragraphs at tops of pages */
#define IP_H3DEF 16  /* h3 tags should be formatted like :dl's if start with a bitmap */
// ShowPar input flags:
#define SP_PAGEUP   1
#define SP_PAGEDOWN 2
#define SP_LETTER   4
#define SP_SHOWPAGE 8
#define SP_PARDOWN  16
// DrawLine flag:
#define DL_CALCLINE 1
// CER ADDITION: flags for font text
#define BOLD_FONT      1
#define ITALIC_FONT    2
#define UNDERLINE_FONT 4
// end CER ADDITION // InitStr
define MAXSTRNUM 900  /* max number of strings CER CHANGE: previously 300 */

// DrawText options
#define DT_SHOWPAGE (DT_TOP | DT_LEFT | DT_NOPREFIX | DT_EXTERNALLEADING | DT_NOCLIP)

/*  Global String IDs    */ define IDS_OK              10000  /* Positive Answer */
define IDS_CANCEL          10010  /* Negative response */
#define IDS_EXIT            10011  /* Exit the program */
#define IDS_PRINT           10020
#define IDS_HELP            10030
#define IDS_HELP_CONTENTS   10031  /* Help - Contents */
#define IDS_HOW_TO_USE      10032  /* How to Use Help */
#define IDS_FILE            10040
#define IDS_OPEN            10050
#define IDS_NEW             10060
#define IDS_SAVE            10070
#define IDS_SAVE_AS         10072
#define IDS_OPTIONS         10074
#define IDS_VIEW            10078
#define IDS_USING_HELP      10084
#define IDS_RESTORE         10090
#define IDS_MOVE            10092
#define IDS_SIZE            10094
#define IDS_MINIMIZE        10086
#define IDS_MAXIMIZE        10088
#define IDS_CUSTOMIZE       10076
#define IDS_HELP_INDEX      10080
#define IDS_GENERAL_HELP    10082
#define IDS_KEYS_HELP       10086
#define IDS_PRODUCT_INFORMATION 10088
```

```
#define IDS_HIDE          10100
#define IDS_CLOSE         10102
#define IDS_WINDOW_LIST       10104
#define IDS_YES           10106
#define IDS_NO            10108
#define IDS_ENTER         10110
#define IDS_PAGE_UP       10112
#define IDS_PAGE_DOWN         10114
#define IDS_HOME          10116
#define IDS_END           10118
#define IDS_ESC           10120
#define IDS_TAB           10122
#define IDS_F1            10124

// BMSUBSET strings define IDS_MEMERR  10940
define IDS_PARERR  10941
#define IDS_LINERR  10942
#define IDS_TAGERR  10943
#define IDS_FILERR  10944
#define IDS_PTHERR  10945
#define IDS_WRDERR  10946
#define IDS_NSTERR  10947
#define IDS_LDTERR  10948
#define IDS_TRMERR  10949
#define IDS_BULLET  10950
#define IDS_NUMSUF  10951
#define IDS_PAGERR  10957
define IDS_NOTE    10958 define IDS_DOUBLE_SPACE_CHARS 960

// Bitmaps for imbedding in text define IDTBL     299  // id for bitmaps read from the disk define IDB_SYSMENU  300  // Windows Buttons
define IDB_BSYSMENU 301
#define IDB_SSYSMENU 302
#define IDB_MAXIMIZE 303
#define IDB_MINIMIZE 304
#define IDB_RESTORE  305
#define IDB_DNARWLIN 306
#define IDB_MAXCHAR  307  // Characters inside Windows Buttons
#define IDB_MINCHAR  308
#define IDB_RESTCHAR 309
#define IDB_SYSCHAR  310
#define IDB_BSYSCHAR 311
#define IDB_UPARCHAR 312  // Keyboard characters
#define IDB_DNARCHAR 313
#define IDB_LFARCHAR 314
#define IDB_RGARCHAR 315
#define IDB_UPCHAR   316
#define IDB_DOWNCHAR 317
#define IDB_LEFTCHAR 318
#define IDB_RITECHAR 319
#define IDB_ENTRCHAR 320
#define IDB_PGUPCHAR 321
#define IDB_PGDNCHAR 322
#define IDB_HOMECHAR 323
#define IDB_SIZENS   324  // Mouse pointers
#define IDB_SIZEWE   325
#define IDB_SIZE     326
#define IDB_ARROW    327
#define IDB_WAIT     328
#define IDB_WFMFOLD1 329  // File Mgr
#define IDB_WFMEXEC1 330
#define IDB_WFMDATA1 331
#define IDB_WFMASCI1 332
#define IDB_WFMADRV  333
#define IDB_WFMCDRV  334
#define IDB_WPTSCS   335  // Paintbrush
#define IDB_WPTPBR   336
#define IDB_WPTBOXH  337
#define IDB_WPTBOXF  338
#define IDB_WPTERAS  339
#define IDB_WPTTEXT  340
#define IDB_WCNBELL  341
#define IDB_ASTERISK 342  // Bookmaster symbols
```

```
define IDB_RBL   343 define MAXNUMBITMAPS  120 /* Max number of bitmaps that can be predefined */
define MAXINTERNALBITMAP 400 /* higher than last bitmap number */ define MAXNUMICONS   100 /* Max number of icons that will be in \WELCOME */
/* This is the number of nameits you can have          */
#define MAXNUMUSYMBOLS 20  /* Max number of user defined symbols */
#define MAXLENUSYMBOLS 100  /* Max length of a user defined symbol  CER CHANGE: previously 32 */
#define MAXNUMSYMBOLS (MAXNUMICONS + MAXNUMBITMAPS + MAXNUMUSYMBOLS) /* Maximum number of symbols */
define IDB_ICON   257  // .idb value used for all icons // Used in OpenIcoFile:
define BITSPERBYTE  8
#define MONO_PLANES 1
#define MONO_BITS 1
/* flags for _lseek */
#define SEEK_CUR 1
#define SEEK_END 2
#define SEEK_SET 0

/*------------------------------------------*
 * Data Type Definitions                    *
 *------------------------------------------*/ typedef struct StructParaShown {     // Paragraphs shown on screen
   int  yTop;            // Top line of paragraph
   int  yBottom;         // Bottom
   char szFile[MAXIDLEN];   // File for cross-reference
} STRUCTPARSHOWN;

typedef struct StructPageShown {     // Data for pages
   char szLine[MAXLINELEN];  // Header text
   char szFile[MAXIDLEN];    // File for cross-reference
} STRUCTPAGESHOWN;

typedef struct StructBMPage {
   RECT       rectDst;       // rectangle on the dc of my caller
   GLOBALHANDLE hPageText;   // The actual paragraph text; nonzero if exists
   LOCALHANDLE hParagraph;   // Array of Paragraph structures
   int        cParagraph;    // Number of paragraphs
   int        cParShown;     // Number of paragraphs shown on screen
   int        cPageTops;     // # paragraphs - # that can fit at end
   WORD       wIPFlags;      // InitPage input flags
   char       szIPError[256]; // InitPage error text, if any
   char       szProgram[MAXIDLEN];   // CER ADDITION: program index will start
//Show the id and dimensions of each paragraph on the screen:
   STRUCTPARSHOWN ParShown[MAXPARSHOWN];

// Show the id and text for the most recent :h3 for each subpage:
   STRUCTPAGESHOWN PageShown[MAXNUMPAGES];

LOGFONT lf;         // The font I should use
   LOGFONT lfh;        // The font for headers; optional HANDLE hinstance;   // Instance handle of my caller
} STRUCTBMPAGE;

// Function Prototypes for BMSUBSET.DLL
int FAR PASCAL GetLine  (LPDWORD, LPSTR);
void FAR PASCAL GetLineAnsi (BOOL);
int FAR PASCAL SplitLine (HDC, LPSTR, int);
int FAR PASCAL InitPage  (STRUCTBMPAGE FAR *, HDC, LPRECT, LPSTR, WORD);
int FAR PASCAL ShowPar  (STRUCTBMPAGE FAR *, HDC, int, WORD);
void FAR PASCAL ShowPage (STRUCTBMPAGE FAR *, HDC, int);
void FAR PASCAL SortTerm (STRUCTBMPAGE FAR *);
void FAR PASCAL SortDef  (STRUCTBMPAGE FAR *);
void FAR PASCAL KillPage (STRUCTBMPAGE FAR *);
BOOL FAR PASCAL InitStr  (LPSTR);
BOOL FAR PASCAL AddStr   (LPSTR);
BOOL FAR PASCAL CopyStr  (WORD, LPSTR);
LPSTR FAR PASCAL GetParID (STRUCTBMPAGE FAR *, int, LPSTR);
int FAR PASCAL DrawLine (STRUCTBMPAGE FAR *, HDC, LPSTR, LPPOINT, WORD);
int FAR PASCAL WEP (int nParameter);
// CER CHANGE:
void DispText(char *, HDC, RECT, int);
```

```
    RECT rect;
    HWND hCtrl;         // handle to dialog control
    RECT brect;         // rectangle of a button
    char szTemp[MAXLINELEN];   // GetStr to here so it can be sliced and diced
    char szS1[MAXSTRLEN];      // GetStr to here so it can be sliced and diced
    char szRun[256];           // Run = line from WIN.INI
    char szReplace[256];       // rebuilt run= line minus WELCOME\WELCOME
    int iWidth;
    HDC hdc;
    TEXTMETRIC tm;
    int cyChar, iHeight;

switch (message) {
    case WM_INITDIALOG:
       InitStr (szCC);
       AddStr("WELC");
       SetWindowText(hDlg, GetStr(IDS_TITLE));
       hdc = GetDC(hDlg);

GetTextMetrics(hdc,&tm);
       cyChar = tm.tmHeight + tm.tmExternalLeading;

// Text for confirmation box
   oostrcpy (szS1, GetStr(IDS_YOUSURE));

// Height of text in dialog box
       iHeight = SplitLine(hdc,szS1,GetSystemMetrics (SM_CXSCREEN)*3/4) * cyChar;
       ReleaseDC(hDlg,hdc);

// Move the whole dialog box
       MoveWindow(hDlg, GetSystemMetrics( SM_CXSCREEN)/8,  // x pos.
              GetSystemMetrics (SM_CYSCREEN)/5,  // y pos.
   oooo       GetSystemMetrics (SM_CXSCREEN)*3/4,  // width
                 iHeight +5*cyChar+ 3* GetSystemMetrics(SM_CYFRAME),
                 FALSE);

o  // Set text on buttons

SetDlgItemText (hDlg, IDCANCEL, strcpy (szTemp, GetStr (IDS_CANCEL)));
       SetDlgItemText (hDlg, IDOK, GetStr (IDS_OK));

GetClientRect(hDlg,&rect);

// OK button   size it and position it
       hdc = GetDC (hDlg);

strcat (szTemp, "   ");  // add 4 spaces to size of button
       iWidth = (int) GetTextExtent (hdc, szTemp, strlen (szTemp));

ReleaseDC(hDlg,hdc);

hCtrl = GetDlgItem(hDlg,IDOK);
       GetClientRect(hCtrl, &brect);

MoveWindow (hCtrl, (rect.right-2*iWidth)*3/8,
              rect.bottom - brect.bottom-GetSystemMetrics(SM_CYFRAME),
              iWidth,
              brect.bottom,
   oooooooo  FALSE);

//Cancel button  size it and position it hCtrl = GetDlgItem(hDlg,IDCANCEL);

MoveWindow (hCtrl, (rect.right-2*iWidth)*5/8+iWidth,
              rect.bottom - brect.bottom-GetSystemMetrics(SM_CYFRAME),
              iWidth,
              brect.bottom,
              FALSE);
   // Text - Are you really sure you want to do this ...

hCtrl = GetDlgItem(hDlg,IDBESURE);

MoveWindow (hCtrl, rect.left+ 4*GetSystemMetrics(SM_CXFRAME),
   oooo       rect.top + 2*GetSystemMetrics(SM_CYFRAME),
              rect.right - 8* GetSystemMetrics(SM_CXFRAME),
              rect.bottom-2*brect.bottom - GetSystemMetrics(SM_CYFRAME),
```

```
                    FALSE);
oSetDlgItemText (hDlg, IDBESURE, GetStr (IDS_YOUSURE));

return TRUE;    // end WM_INITDIALOG
```

We claim:

1. A data processing system that facilitates translation of text associated with an application program executed by the data processing system, the data processing system comprising:
   a. a system memory having first and second memory partitions, the first memory partition to define a first memory region for storing a global string file comprising character strings representing text associated with a plurality of application programs and the second memory partition to define a second memory region for storing at least one private string file comprising character strings representing text associated with at least one specific application program;
   b. a mass-storage device having stored therein a set of global string files and at least one set of private string files, each member of each set containing character strings representing a different text translation;
   c. a processor for loading a selected global string file from said mass-storage device into the first memory and for loading at least one selected private string file from said mass-storage device into the second memory region of said system memory; and
   d. a string processor responsive to commands embedded in the application program, said string processor for retrieving designated ones of the character strings from the first and second memory regions.

2. The data processing system of claim 1 further comprising a display and wherein said string processor further comprises means for causing the designated ones of the character strings to be displayed on said display.

3. The data processing system of claim 1 wherein said string processor is responsive to commands issued by a plurality of application programs.

4. The system of claim 1 wherein said string-processor includes means responsive to commands wherein the commands instruct said string processor to load global and private string files appropriate to a designated country from said mass storage device to respective ones of the first and second regions of said system memory.

5. A data processing system that facilitates translation of text associated with application programs executed by the data processing system, the data processing system comprising:
   a. a mass-storage device having stored thereon (i) a plurality of global string files that include character strings representing text associated with a plurality of application programs, each global string file containing character strings representing different text translations, and (ii) at least one private string file comprising character strings representing text associated with at least one specific application program; and
   b. a string processor for selecting a global string file and at least one private string file in response to one or more commands embedded in the application program and for retrieving from the selected files designated ones of the character strings and causing display thereof.

6. The data processing system of claim 5 wherein said string processor is responsive to commands issued by a plurality of application programs.

7. The data processing system of claim 6 wherein the string-processor commands include instructions to retrieve at least one of the plurality global string files and the at least one private string file from said mass storage device and to store the at least one of the plurality of global string files and the at least one private string file appropriate to a designated country in said system memory.

8. A method of facilitating translation of text associated with application programs executed on a computer system, the method comprising:
   a. establishing a global string file comprising character strings representing text associated with a plurality of application programs;
   b. establishing at least one private string file comprising character strings representing text associated with at least one specific application program;
   c. providing a stored set of global string files and at least one set of private string files, each member of each set containing character strings representing a different text translation;
   d. providing a string processor, responsive to commands embedded in the application programs, said string processor for retrieving and causing display of designated ones of the character strings from private and global string files loaded into computer memory;
   e. embedding string retrieval and display commands in the application program; and
   f. loading from a mass storage device a selected stored global string file and at least one selected stored private string file into first and second regions of a computer memory.

9. The method of claim 8 further comprising the step of compiling the application program containing the embedded commands.

10. The method of claim 8 wherein the selected stored global string file and the at least one selected stored private string file are identified by reference to a selected destination country.

11. A method of translating a predetermined application program containing text, the method comprising the steps of:
   (a) establishing a global string library, the global string file including character strings representing text associated with a plurality of application programs including the predetermine application program;
   (b) establishing a private string library, the private string file including character strings representing text associated with the predetermined application program;
   (c) identifying repeated items of text in the predetermined application program;
   (d) translating the repeated items of text into a selected language;
   (e) storing each translated repeated item of text once as a separate character string in the private string library;
   (f) translating the remaining items of text from the predetermined application program;
   (g) storing the remaining translated items as separate character strings in the private string library;
   (h) embedding commands within the predetermined application program, wherein the commands control a string processor;
   (i) executing the predetermined application program;
   (j) retrieving, via the string processor, designated ones of the character strings from the private string library wherein the string processor retrieves the designated ones of the character strings in response to the commands embedded in the predetermined application program; and
   (k) displaying, via the string processor, the designated ones of the character strings retrieved from the private string library in said retrieving step.

* * * * *